(12) United States Patent
Ueki

(10) Patent No.: US 6,909,535 B2
(45) Date of Patent: Jun. 21, 2005

(54) OPTICAL COMMUNICATION SYSTEM EMPLOYING RAMAN AMPLIFICATION

(75) Inventor: Toshikazu Ueki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 10/269,078

(22) Filed: Oct. 11, 2002

(65) Prior Publication Data

US 2003/0165004 A1 Sep. 4, 2003

(30) Foreign Application Priority Data

Mar. 4, 2002 (JP) ........................................ 2002-056846

(51) Int. Cl.⁷ ............................ H01S 3/00; H04B 10/12
(52) U.S. Cl. ..................................... 359/334; 359/341.3
(58) Field of Search ............................................ 359/334

(56) References Cited

U.S. PATENT DOCUMENTS 6,404,964 B1 * 6/2002 Bhagavatula et al. ........ 385/123
6,795,235 B1 * 9/2004 Okuno et al. ................ 359/334

FOREIGN PATENT DOCUMENTS

JP          2001-237777          8/2001

OTHER PUBLICATIONS

Hainberger et al., "Optimum span configuration of Raman–amplified dispersion–managed fibers", OFC, Mar. 19, 2001, MI5–1 to MI5–3.
Okuno et al., "Novel Lossless Optical Transmission Line with Distributed Raman Amlification", ECOC, 2000, vol. 2.

* cited by examiner

Primary Examiner—Thomas H. Tarcza
Assistant Examiner—Eric Bolda
(74) Attorney, Agent, or Firm—Staas & Halsey LLP

(57) ABSTRACT

An optical communication system employing Raman amplification includes a plurality of first optical fibers each having a first nonlinear effective cross sectional area and each coupled to a terminal station or a repeater in a transmission line between the terminal station and the repeater or between two repeaters, a second optical fiber having a second nonlinear effective cross sectional area larger than the first nonlinear effective cross sectional area and coupled between two first optical fibers. The Raman amplification is made in the transmission line by pumping in two directions from the two repeaters coupled to both ends of the transmission line or from the terminal station and the repeater.

20 Claims, 14 Drawing Sheets

OPTICAL COMMUNICATION SYSTEM EMPLOYING RAMAN AMPLIFICATION

BACKGROUND OF THE INVENTION

This application claims the benefit of a Japanese Patent Application No.2002-056846 filed Mar. 4, 2002, in the Japanese Patent Office, the disclosure of which is hereby incorporated by reference.

1. Field of the Invention

The present invention generally relates to optical communication systems employing Raman amplification, and more particularly to an optical communication system which employs the Raman amplification with a satisfactory nonlinear characteristic and is capable of making a communication regardless of a location of a disconnection in an optical fiber which forms a trunk transmission line.

2. Description of the Related Art

After the optical communication system was developed in the 1950's, an optical regenerative repeater used when making the optical communication over a long distance had three basic functions, namely, reshaping, retiming and regenerating. But in order to realize the three basic functions, there were problems in that the structure of the optical regenerative repeater became complex, a large number of adjustments was required in the optical regenerative repeater, and the cost reduction of the optical regenerative repeater became difficult.

In addition, even though the optical signal is normally unaffected by the electromagnetic waves, the optical regenerative repeater must once convert the optical signal into an electrical signal, and regenerate the waveform before converting the electrical signal back into the optical signal, when performing the repeater function. As a result, considerations had to be made in the electrical design and the packaging design in order to prevent deterioration of a bit error rate caused by the repeater function, thereby making it more difficult to reduce the cost of the optical regenerative repeater.

In the 1980's, an optical fiber amplifier was developed. The optical fiber amplifier uses an optical fiber having a core added with ions of a rare earth element, such as erbium ions. The optical fiber amplifier is not only used in place of the optical regenerative repeater, but is also used as an output amplifier of a terminal station in various optical communication systems.

In a case where an optical fiber amplifier, using an erbium-added optical fiber which has the core added with the erbium ions, is used as the repeater of the optical communication system, it is possible to greatly reduce the number of parts within the repeater and to greatly reduce the number of adjustments which are required in the repeater. Consequently, it is possible in this case to reduce the cost and improve the reliability of the optical communication system.

At the same time, the transmission capacity required of the optical communication system has continued to increase, and there are now demands to further increase the transmission speed. The optical fiber is originally subjected to a waveform deterioration factor, that is, wavelength dispersion (often simply referred to as "dispersion") which corresponds to group delay distortion which is generated when transmitting electrical signals. For this reason, there was a problem in that the transmission quality of the optical fiber deteriorates more as the transmission rate becomes higher.

A system has been proposed which combines an optical fiber having a positive dispersion slope (hereinafter simply referred to as a "positive dispersion fiber") and an optical fiber having a negative dispersion slope (hereinafter simply referred to as a "negative dispersion fiber") in order to form a trunk transmission line and compensates for the dispersion. The positive dispersion fiber has a large core diameter, and deterioration of the transmission quality caused by nonlinear distortion is small. The negative dispersion fiber has a small core diameter in order to realize the negative dispersion slope, and the deterioration of the transmission quality caused by the nonlinear distortion is generally large.

However, by arranging the positive dispersion fiber which is less affected by the nonlinear distortion in the first half of the trunk transmission line and arranging the negative dispersion fiber in the second half of the trunk transmission line, the level of the optical signal input to the negative dispersion fiber becomes low due to attenuation of the optical signal while being transmitted through the positive dispersion fiber. Hence, it is possible to suppress the generation of the nonlinear distortion in the negative dispersion fiber. Therefore, a long-distance optical communication system having satisfactory characteristics can be formed by the repeater which is made up of the optical fiber amplifier using the erbium-added optical fiber, and the optical transmission line which is made up of the combination of the positive dispersion fiber and the negative dispersion fiber.

Due to the recent globalization and rapidly increasing used of the Internet, the demands for increased transmission capacity with respect to the optical communication system continue to increase. In order to cope with such demands, a wavelength division multiplexing (WDM) technique has been proposed. According to the WDM technique, a plurality of optical signals obtained by respectively modulating lights having a plurality of wavelengths by different electrical signals are multiplexed and transmitted through a single optical fiber. Active research on the WDM technique itself was made in the 1950's, but the application to a high-speed large-capacity optical communication system has been made only recently. The broadening of the band and the increasing of the capacity in the optical communication system have been made in this manner.

A problem was encountered in the transmission band of the repeater which is made up of the optical fiber amplifier using the erbium-added optical fiber due to the broadening of the band of the optical communication system. However, by adding a gain equalizer or a loss equalizer having desired characteristics with respect to the optical signal, it was possible to compensate for the wavelength characteristic of the gain of the optical fiber amplifier using the erbium-added optical fiber, and to widen the wavelength region in which the gain of the optical fiber amplifier using the erbium-added optical fiber is constant. But with respect to the demands to further broaden the band of the optical communication system, there are views that virtually the limit has been reached in coping with such demands.

On the other hand, a Raman amplifier which uses the stimulated Raman scattering (SRS) phenomenon and has a broad transmission band has been proposed.

FIG. 1 is a diagram for explaining an example of a conventional optical communication system employing the Raman amplification. It is assumed for the sake of convenience that the conventional optical communication system shown in FIG. 1 is applied to an optical submarine communication system. In FIG. 1, only an up-line or down-line is shown.

Terminal repeating installations 101 and 101a shown in FIG. 1 are respectively provided within a terminal station which is set up at a boundary of a ground transmission line and a submarine transmission line. Each of the terminal repeating installations 101 and 101a includes a transmission unit for a main signal, a transmission unit for a monitor signal, and a power supply unit for submarine repeaters.

One span of trunk transmission line is formed by a positive dispersion fiber 103 and a negative dispersion fiber 106, and one span of trunk transmission line is formed by a positive dispersion fiber 103a and a negative dispersion fiber 106a.

A repeater is provided at a boundary between two trunk transmission lines which are respectively made up of the positive dispersion fiber and the negative dispersion fiber. Only a portion of the repeater is shown in FIG. 1. One repeater on the left side in FIG. 1 includes a light source 104a for Raman pumping (hereinafter referred to as a Raman pump light source 104a) for generating a Raman pump light, and a coupler 105a for coupling the Raman pump light emitted from the Raman pump light source 104a to the negative dispersion fiber 106. Another repeater on the right side in FIG. 1 includes a Raman pump light source 104c for generating a Raman pump light, and a coupler 105b for coupling the Raman pump light emitted from the Raman pump light source 104c to the negative dispersion fiber 106a.

An optical signal which is transmitted at a regular level from the terminal repeating installation 101 attenuates within the positive dispersion fiber 103, but is amplified by an energy of the Raman pump light while propagating within the negative dispersion fiber 106 which is pumped by the Raman pump light. Hence, the optical signal has a sufficiently high level at an output end of the negative dispersion fiber 106. The level of the optical signal at the output end of the negative dispersion fiber 106 is determined by taking into consideration the attenuation of the optical signal due to losses in a branching filter and a gain equalizer which are not show in FIG. 1 but are provided in the repeater. Hence, the level of the Raman pump light and the length of the negative dispersion fiber 106 are appropriately determined in order to determine the level of the optical signal at the output end of the negative dispersion fiber 106.

FIG. 2 is a diagram showing an optical signal level transition in one span of the conventional optical communication system employing the Raman amplification. FIG. 2 shows a case where the positive dispersion fiber has a length of 33 km, and the negative dispersion fiber has a length of 17 km.

In FIG. 2, the ordinate indicates the optical signal power in dBm, and the abscissa indicates a transmission distance in km. The unit dBm is a unit of power with reference to 1 mW, which is obtained from $10\log_{10}(P \text{ mW}/1 \text{ mW})$, where P denotes the optical signal power. In this case, a loss of approximately 6 dB occurs in the positive dispersion fiber. Hence, the negative dispersion fiber needs to compensate for this loss, and in an ideal case where there is no loss in the repeater, the negative dispersion fiber only needs to amplify by approximately 6 dB. However, the loss does occur in the repeater as described above, and the amplification must be made in the negative dispersion fiber by taking into consideration this loss in the repeater. In this example, it is assumed for the sake of convenience that the loss in the repeater is approximately 7 dB, and thus, the negative dispersion fiber must make an amplification by approximately 13 dB.

Thereafter, the optical signal is transmitted similarly, and finally reaches the terminal repeating installation 101a.

As described above, the negative dispersion fiber has a small core diameter, thereby making it difficult to suppress the deterioration of the transmission quality caused by the nonlinear distortion. On the other hand, the repeater positively utilizes the nonlinear distortion caused by the small core diameter, so as to make an amplification by stimulated Raman scattering (SRS).

FIGS. 3A and 3B are diagrams for explaining a first problem of the conventional optical communication system employing the Raman amplification. FIGS. 3A and 3B show cases to explain that, when a disconnection occurs in an optical cable, it may not be possible to transmit information indicating the disconnection from the repeater to the terminal repeating installation, depending on the location of the disconnection. In FIGS. 3A and 3B, those parts which are the same as those corresponding parts in FIG. 1 are designated by the same reference numerals, and a description thereof will be omitted.

FIG. 3A shows a case where the disconnection occurs in the optical cable at a location distant from the repeater. More particularly, the disconnection is located in a vicinity of a boundary between the negative dispersion fiber 106 and the positive dispersion fiber 103 in FIG. 3A.

In this case, the Raman pump light is coupled by the negative dispersion fiber 106 and can propagate in a direction opposite to a transmitting direction of the optical signal. Since the optical cable has the disconnection and the optical signal cannot propagate through the optical cable, the Raman pump light cannot amplify the optical signal. However, spontaneous emission light is generated as a result of the Raman pump light applying molecular vibration energy to the material forming the optical fiber of the optical cable. Moreover, the power of the spontaneous emission light reaching the repeater is relatively large because the optical signal is not amplified. Accordingly, if the Raman pump light is modulated by a specific electrical signal in the repeater, the spontaneous emission light can be modulated by the specific electrical signal, and the modulated spontaneous emission light can reach the terminal repeating installation 101a while being amplified in the subsequent span. In other words, it is possible in this case to transmit information indicating the disconnection of the optical cable to a maintenance person at the terminal repeating installation 101a.

On the other hand, FIG. 3B shows a case where the disconnection occurs in the optical cable at a location close to the repeater. More particularly, the disconnection is located in a vicinity of a boundary between the negative dispersion fiber 106 and the repeater in FIG. 3B.

In this case, the Raman pump light is coupled by the negative dispersion fiber 106 but can propagate for only a short distance in a direction opposite to the transmitting direction of the optical signal. Hence, the power of the spontaneous emission light which is generated is small. For this reason, even when the Raman pump light is modulated by the specific electrical signal in the repeater, it is not possible to obtain a modulated spontaneous emission light which is modulated by the specific electrical signal and has a sufficiently high power. In this case, the information indicating the disconnection of the optical cable cannot be transmitted to the maintenance person at the terminal repeating installation 101a.

In addition, although it is possible to transmit the disconnection information indicating the disconnection at the location distant from the repeater and not the disconnection information indicating the disconnection at the location close to the repeater, it is impossible to accurately distinguish the distant and close locations of the disconnections relative to the repeater. In other words, it is impossible to accurately distinguish the case where the disconnection information can be transmitted to the maintenance person at the terminal repeating installation 101a and the case where the disconnection cannot be transmitted to the maintenance person at the terminal repeating installation 101a.

FIG. 4 is a diagram showing a nonlinear characteristic in one span of the conventional optical communication system employing the Raman amplification. In addition, FIG. 5A is a diagram showing a structure of one span in the conventional optical communication system, which takes a trunk transmission line as an example. FIG. 5B is a diagram showing a structure of one span in an optical communication system according to the present invention, and will be described later.

The structure shown in FIG. 5A includes repeaters 107 and 107a, a positive dispersion fiber 103, and a negative dispersion fiber 106. The repeaters 107 and 107a are indicated by lines, because it is difficult to accurately illustrate the length of the trunk transmission line if the repeater which is small within the trunk transmission line is illustrated by a block.

In FIG. 4, the ordinate indicates a nonlinear amount of the optical signal, and the abscissa indicates a distance from the repeater 107. The nonlinear amount is proportional to [(power of optical signal)×(nonlinear refractive index)/(nonlinear effective cross sectional area of core)]. Accordingly, the nonlinear amount takes extremely small values in the positive dispersion fiber 103 for a distance of up to 33 km from the repeater 107.

The power of the optical signal remains unchanged at a node between the positive dispersion fiber 103 and the negative dispersion fiber 106, located 33 km from the repeater 107. However, since the cross sectional area of the core becomes discontinuous at this node, the nonlinear amount makes a step increase.

Thereafter, as the optical signal propagates from the node located 33 km from the repeater 107 towards the repeater 107a located 50 km from the repeater 107, the amplification by the Raman pump light increases, thereby increasing the power of the optical signal. For this reason, the nonlinear distortion generated within the negative dispersion fiber 106 gradually increases, and becomes a maximum at a node between the negative dispersion fiber 106 and the repeater 107a. Moreover, because the optical signal must be amplified to a level which takes into consideration the loss of the repeater 107a as described above, the nonlinear distortion undergoes a corresponding increase.

The optical communication system employing the Raman amplification does not carry out a regenerative repeater function. Consequently, the nonlinear distortion is accumulated as the span of the repeater increases, to thereby deteriorate the transmission quality.

SUMMARY OF THE INVENTION

Accordingly, it is a general object of the present invention to provide a novel and useful optical communication system employing Raman amplification, in which the problems described above are eliminated.

Another and more specific object of the present invention is to provide an optical communication system employing Raman amplification, which can communicate information indicating a disconnection in an optical fiber forming a trunk transmission line regardless of a location of the disconnection, and can realize a satisfactory nonlinear characteristic related to the Raman amplification.

Still another object of the present invention is to provide an optical communication system employing Raman amplification, comprising a plurality of first optical fibers, each having a first nonlinear effective cross sectional area, and each coupled to a terminal station or a repeater in a transmission line between the terminal station and the repeater or between two repeaters; a second optical fiber, having a second nonlinear effective cross sectional area larger than the first nonlinear effective cross sectional area, and coupled between two first optical fibers, where the Raman amplification is made in the transmission line by pumping in two directions from the two repeaters coupled to both ends of the transmission line or from the terminal station and the repeater. According to the optical communication system of the present invention, it is possible to communicate information indicating a disconnection in an optical fiber forming a trunk transmission line regardless of a location of the disconnection, and realize a satisfactory nonlinear characteristic related to the Raman amplification. In other words, the nonlinear distortion in the optical fiber having a small nonlinear effective cross sectional area can be suppressed.

A further object of the present invention is to provide an optical communication system employing Raman amplification, comprising a plurality of first optical fibers, each having a first nonlinear effective cross sectional area, and each coupled to a repeater in a transmission line between two repeaters; a second optical fiber, having a second nonlinear effective cross sectional area larger than the first nonlinear effective cross sectional area, and coupled between two first optical fibers; a plurality of third optical fibers, each having the first nonlinear effective cross sectional area, and each coupled to a repeater in a transmission line between a terminal station and the repeater; and a fourth optical fiber, having the second nonlinear effective cross sectional area, and coupled between two third optical fibers, where the Raman amplification is made in the transmission line between the two repeaters by pumping in two directions from the two repeaters coupled to both ends of the transmission line. According to the optical communication system of the present invention, the Raman amplification in the transmission line between the terminal station and the repeater is made by the pumping in one direction, and the Raman amplification in the transmission line between the two repeaters is made by pumping in two directions. Hence, it is possible to communicate information indicating a disconnection in an optical fiber forming a trunk transmission line regardless of a location of the disconnection, and realize a satisfactory nonlinear characteristic related to the Raman amplification. In other words, the nonlinear distortion in the optical fiber having a small nonlinear effective cross sectional area can be suppressed.

Other objects and further features of the present invention will be apparent from the following detailed description when read in conjunction with the accompanying drawings.

DESCRIPTION OF THE PREFERRED EMBODIMENTS

Figure 6:
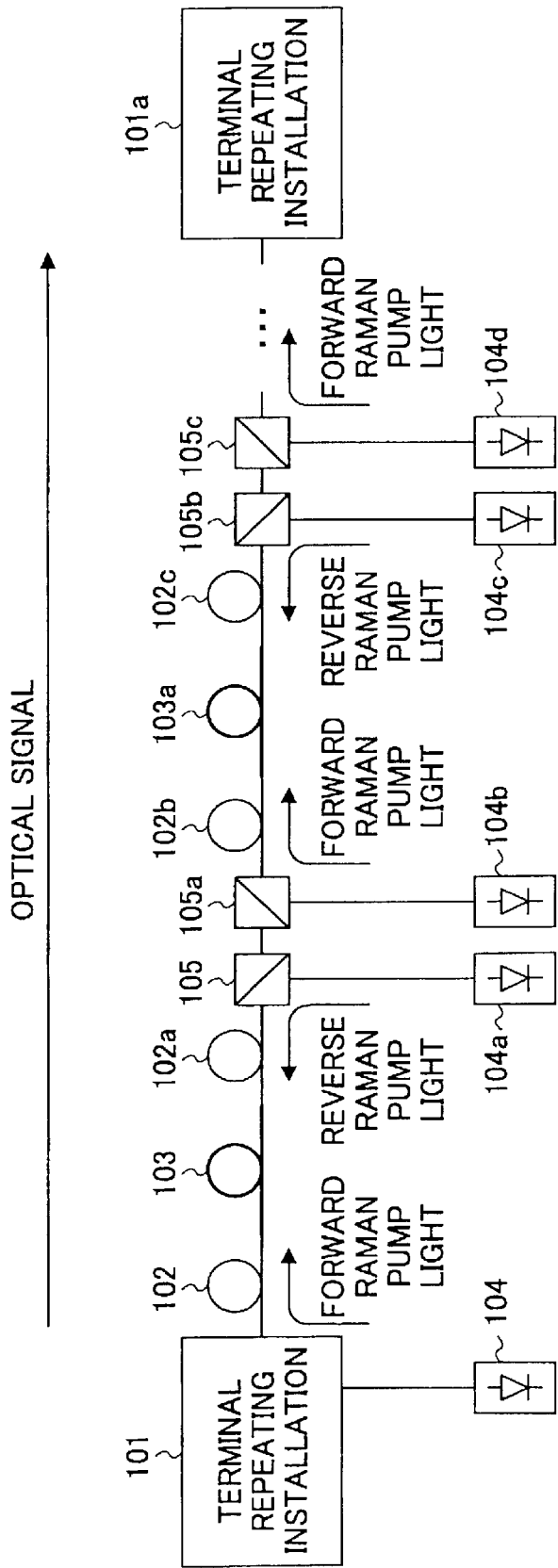
FIG. 6 is a diagram showing an embodiment of an optical communication system employing Raman amplification according to the present invention.

FIG. 6 is a diagram showing an embodiment of an optical communication system employing Raman amplification according to the present invention. In this embodiment, the present invention is applied to an optical submarine communication system. Of course, the application of the present invention is not limited to the optical submarine communication system. However, since it is essential to provide repeaters and trouble detection in the trunk transmission line is extremely important in the case of the optical submarine communication system, the present invention is very effective when applied to the optical submarine communication system. In FIG. 6, only an up-line or down-line is shown for the sake of convenience.

Terminal repeating installations 101 and 101a shown in FIG. 6 are respectively provided within a terminal station which is set up at a boundary of a ground transmission line and a submarine transmission line. Each of the terminal repeating installations 101 and 101a includes a transmission unit for a main signal, a monitor control unit, and a power supply unit for submarine repeaters. In the optical submarine communication system, the terminal repeating installations 101 and 101a are respectively provided within a terminal station which is also referred to as a "cable station".

One span of trunk transmission line is formed by negative dispersion fiber 102, a positive dispersion fiber 103 and a negative dispersion fiber 102a, and one span of trunk transmission line is formed by a negative dispersion fiber 102b, a positive dispersion fiber 103a and a negative dispersion fiber 102c.

A repeater is provided at a boundary between two trunk transmission lines which are respectively made up of the positive dispersion fiber and the negative dispersion fibers connected on respective ends of the positive dispersion fiber. Only a portion of the repeater is shown in FIG. 6. A first repeater on the left side in FIG. 6 includes a Raman pump light source 104a for generating a Raman pump light, a coupler 105 for coupling the Raman pump light emitted from the Raman pump light source 104a to the negative dispersion fiber 102a in a reverse direction with respect to the optical signal, a Raman pump light source 104b for generating a Raman pump light, and a coupler 105a for coupling the Raman pump light emitted from the Raman pump light source 104b to the negative dispersion fiber 102b in the same direction with respect to the optical signal. A second repeater on the right side in FIG. 6 includes a Raman pump light source 104c for generating a Raman pump light, a coupler 105b for coupling the Raman pump light emitted from the Raman pump light source 104c to the negative dispersion fiber 102c in a reverse direction with respect to the optical signal, a Raman pump light source 104d for generating a Raman pump light, and a coupler 105c for coupling the Raman pump light emitted from the Raman pump light source 104d to the negative dispersion fiber (not shown) in the same direction with respect to the optical signal.

A Raman pump light source 104 emits Raman pump light with respect to the negative dispersion fiber 102. In other words, it is assumed in FIG. 6 that all of the trunk transmission lines have the same structure. A lumped constant optical amplifier, such as an optical fiber amplifier using erbium-added optical fiber, may be provided in each of the terminal repeating installation 101 and 101a to amplify the optical signal, and a level diagram may be set freely. Hence, the negative dispersion fiber connected to each of the terminal repeating installations 101 and 101a is not essential.

The Raman pump light sources 104, 104b and 104d supply the Raman pump light in the same direction as the optical signal, while the Raman pump light sources 104a and 104c supply the Raman pump light in the reverse direction with respect to the optical signal. Accordingly, the former supply of Raman pump light will be referred to as a forward pumping, and the latter supply of Raman pump light will be referred to as a reverse (or backward) pumping.

The optical signal which is transmitted from the terminal repeating installation 101 propagates through the trunk transmission line which is formed by the negative dispersion fiber 102, the positive dispersion fiber 103 and the negative dispersion fiber 102a, and reaches the first repeater on the left side in FIG. 6 after being subjected to the Raman amplification in the negative dispersion fibers 102 and 102a. The optical signal transmitted from the first repeater propagates through the trunk transmission line which is formed by the negative dispersion fiber 102b, the positive dispersion fiber 103a and the negative dispersion fiber 102c, and reaches the second repeater on the right side in FIG. 6 after being subjected to the Raman amplification in the negative dispersion fibers 102b and 102c. The optical signal is relayed similarly thereafter, and finally reaches the terminal repeating installation 101a.

Accordingly, in the structure shown in FIG. 6, the level of the optical signal is increased in the first negative dispersion fiber of the trunk transmission line, attenuated in the positive dispersion fiber in the middle, and again increased in the second (last) negative dispersion fiber. Since there is loss in the repeater as described above, the power of the Raman pump light and the length of the negative dispersion fibers must be designed by taking this loss into consideration.

Figure 7:
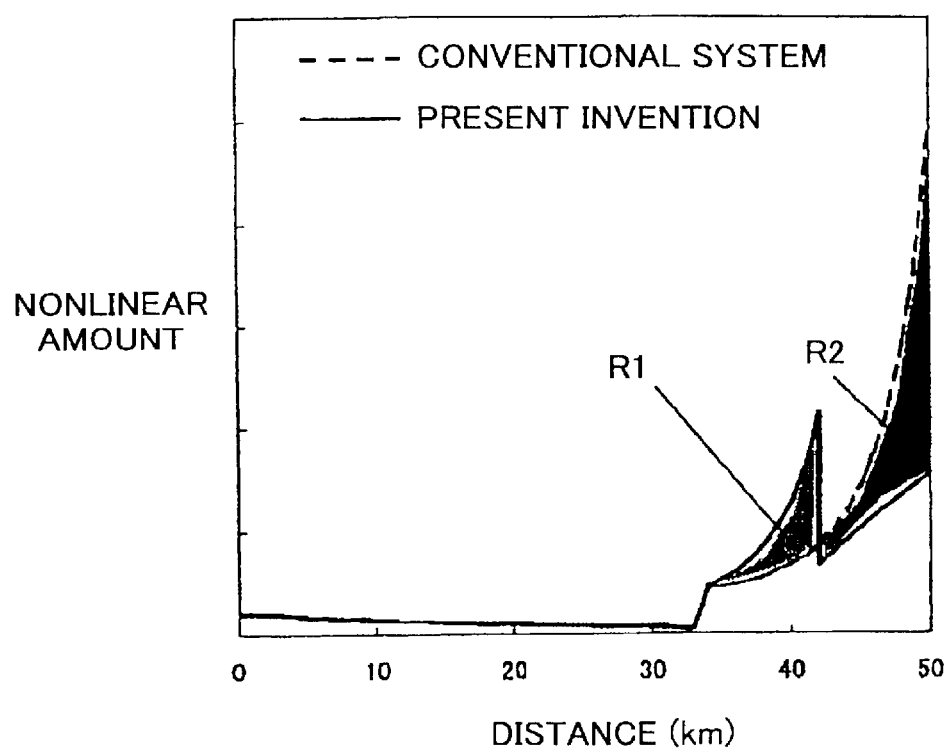
FIG. 7 is a diagram showing nonlinear characteristics in one span of the optical communication system employing Raman amplification according to the present invention and the conventional optical communication system employing Raman amplification.

FIG. 7 is a diagram showing nonlinear characteristics in one span of the optical communication system employing Raman amplification according to the present invention and the conventional optical communication system employing Raman amplification, for facilitating comparison of the nonlinear characteristics of the optical communication system according to the present invention and the conventional optical communication system. For the sake of convenience, it is assumed that one span of the optical communication system according to the present invention has the structure shown in FIG. 5B, and the one span of the conventional optical communication system has the structure shown in FIG. 5A.

Figures 5A, 5B:
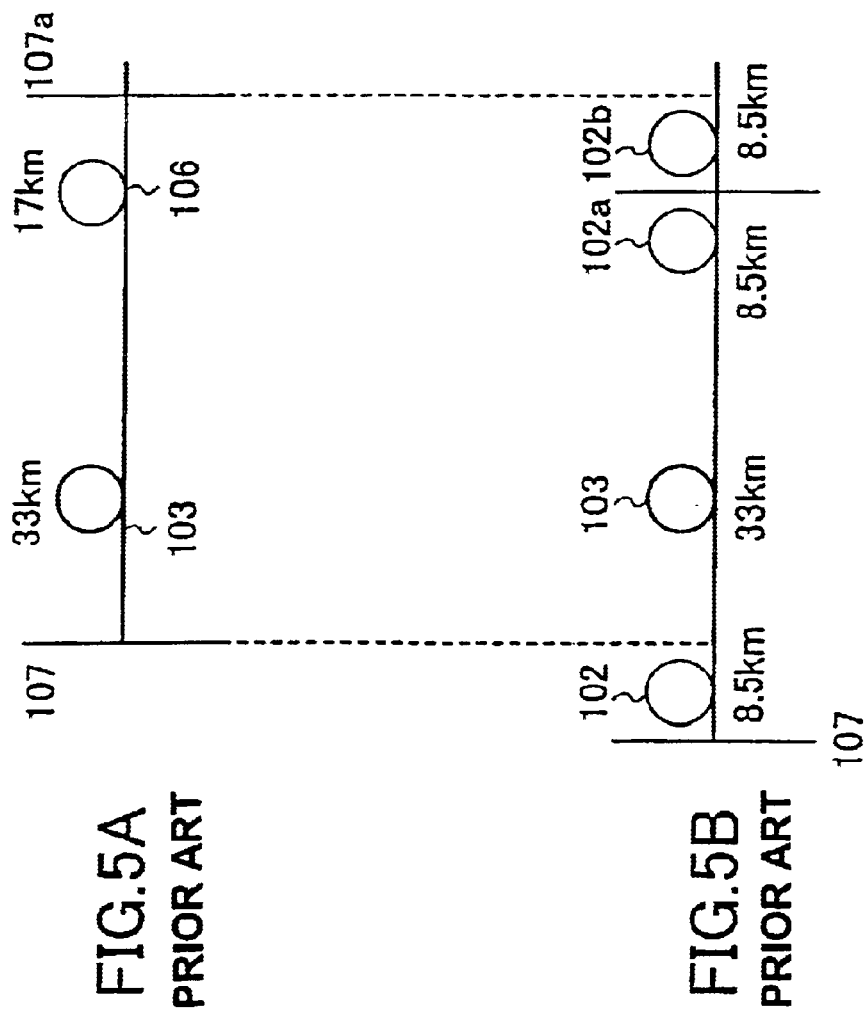
FIG. 5A is a diagram showing a structure of one span in the conventional optical communication system.
FIG. 5B is a diagram showing a structure of one span in an optical communication system according to the present invention.

In FIGS. 5A and 5B, the first repeater is designed by a reference numeral 107, and the second repeater is designed by a reference numeral 107a. In the case of the conventional structure shown in FIG. 5A, one span of the trunk transmission line is formed by the positive dispersion fiber 103 amounting to 33 km and the negative dispersion fiber 106 amounting to 17 km. On the other hand, in the case of the structure according to the present invention shown in FIG. 5B, one span o the trunk transmission line is formed by the negative dispersion fiber 102 amounting to 8.5 km, the positive dispersion fiber 103 amounting to 33 km, and the negative dispersion fiber 102a amounting to 8.5 km.

In order to compare the nonlinear characteristics for the two cases by setting the optical signal level which is input to the positive dispersion fiber 103 the same for the two cases, it is regarded in the structure according to the present invention that one span is formed by a path from the positive dispersion fiber 103 to a negative dispersion fiber connected subsequent to the repeater 107a, as indicated by a broken line in FIG. 5B. Accordingly, although this one span differs from the physical span between the repeaters, no inconveniences are introduced from the point of view of considering the optical fiber linear distortion characteristic.

In FIG. 7, the ordinate indicates the nonlinear amount of the optical signal, and the abscissa indicates the distance from the repeater 107. In FIG. 7, the nonlinear amount for the present invention is indicated by a solid line, and the nonlinear amount for the conventional optical communication system is indicated by a broken line.

Based on the precondition that the same optical signal level is applied to the positive dispersion fiber, the nonlinear amount in the positive dispersion fiber is the same for the present invention and the conventional optical communication system, and the nonlinear amount changes by an extremely small amount. In either case, the positive dispersion fiber 103 and the negative dispersion fiber 102a or 106 are connected at a node located at the 33 km position from the start of the span, the nonlinear amount undergoes a step increase at this node. This phenomenon was described above in conjunction with FIG. 4.

Figure 1:
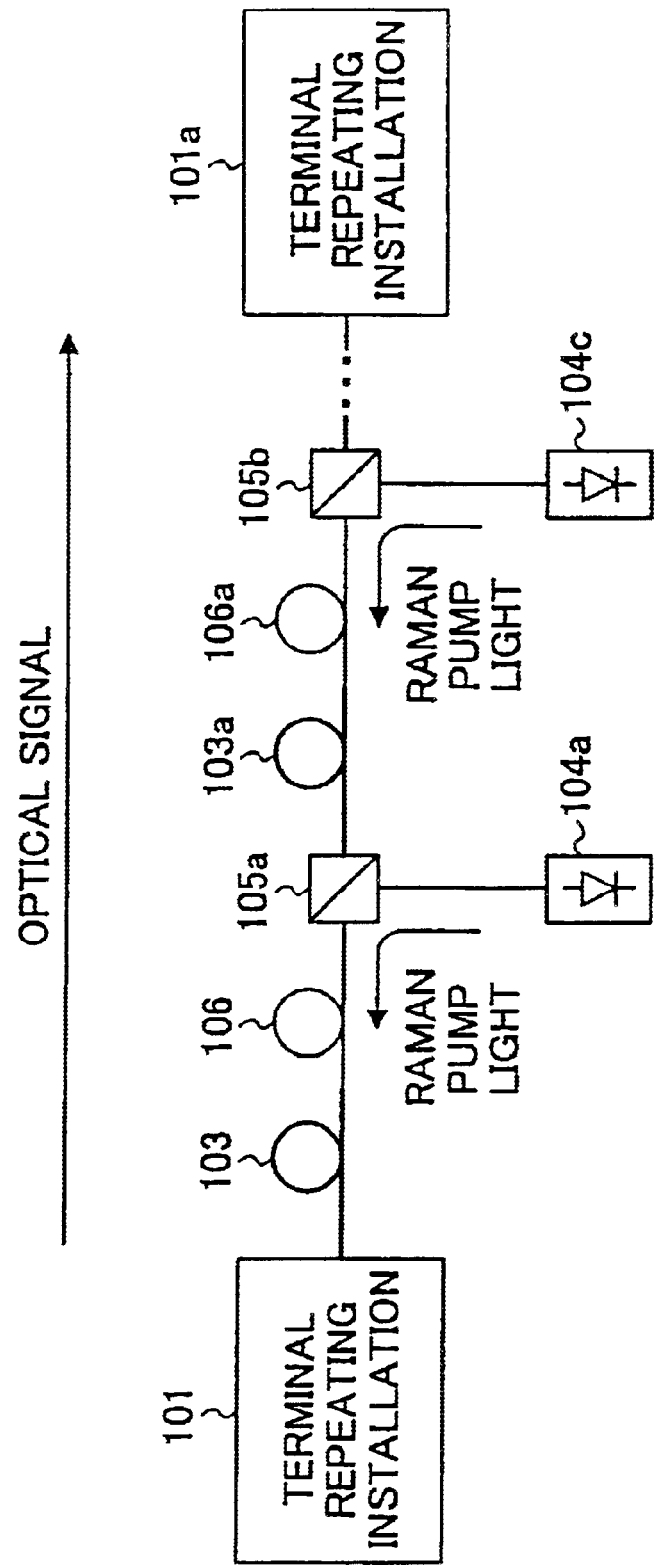
FIG. 1 is a diagram for explaining an example of a conventional optical communication system employing Raman amplification.
Figure 2:
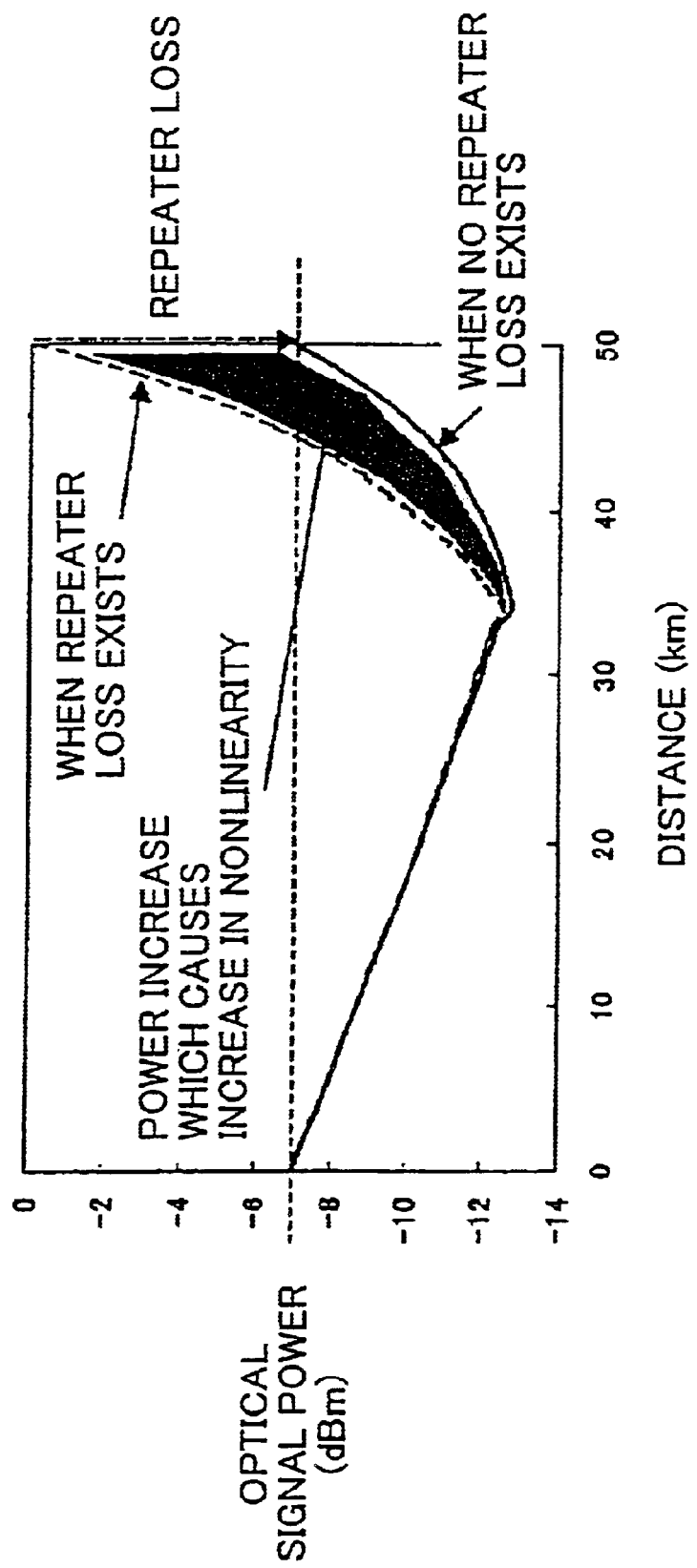
FIG. 2 is a diagram showing an optical signal level transition in one span of the conventional optical communication system employing the Raman amplification.
Figure 3:
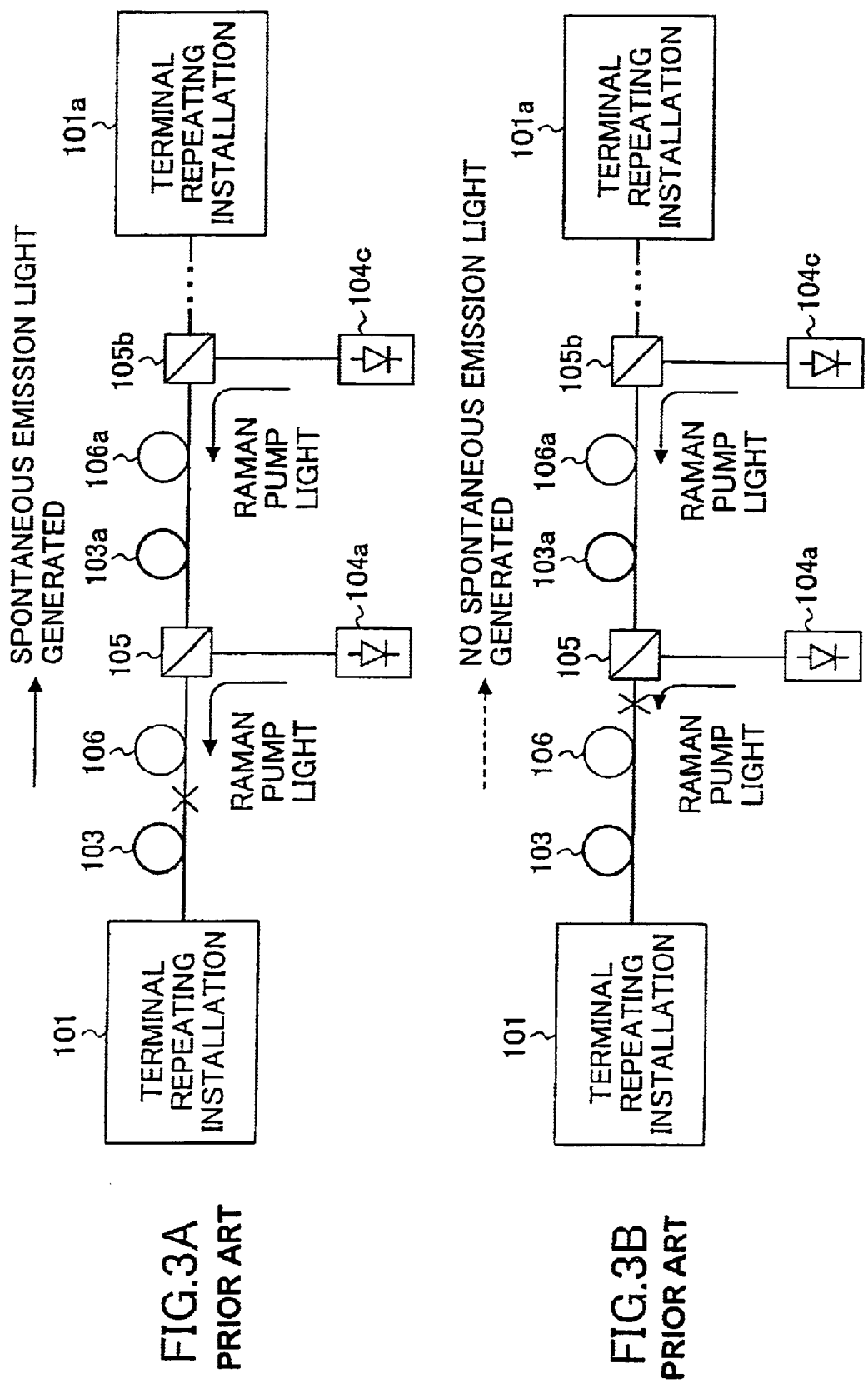
FIGS. 3A and 3B are diagrams for explaining a first problem of the conventional optical communication system employing the Raman amplification.
Figure 4:
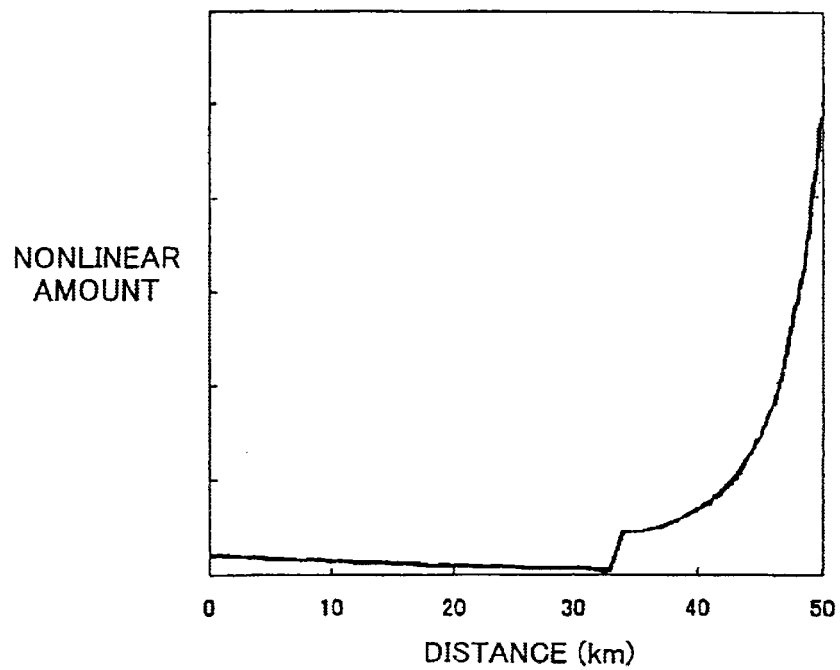
FIG. 4 is a diagram showing a nonlinear characteristic in one span of the conventional optical communication system employing the Raman amplification.

The nonlinear amount for the conventional optical communication system is the same as that shown in FIG. 4. The nonlinear distortion is generated as a result of the Raman amplification in the negative dispersion fiber 106 amounting to 17 km caused by the Raman pump light which is supplied from the repeater 107a which is 50 km from the repeater 107. Hence, the nonlinear distortion becomes a maximum at the 50 km position from the repeater 107, and the nonlinear characteristic includes the step increase at the 33 km position from the repeater 107.

On the other hand, in the present invention, the nonlinear distortion is generated by the Raman amplification in the negative dispersion fiber 102a amounting to 8.5 km caused by the Raman pump light supplied from the repeater 107a which is located at the 41.5 km position from the start of the span. Hence, the nonlinear characteristic includes this nonlinear distortion having a peak at the 41.5 km position from the start of the span, and the step increase at the 33 km position from the start of the span. Moreover, the pumping of the Raman pump light between the 33 km position and the 41.5 km position from the start of the span is stronger in the present invention than in the corresponding portion of the conventional optical communication system. Hence, the pumping of the Raman pump light is stronger in the present invention compared to the conventional optical communication system, and the nonlinear distortion in the present invention is larger. In FIG. 7, R1 denotes this region in which the nonlinear distortion is increased compared to the conventional optical communication system.

Furthermore, in the present invention, the repeater 107a is located at the 41.5 km position from the start of the span, and the optical signal level decreases by an amount corresponding to the loss in the repeater 107a. Hence, the nonlinear distortion undergoes a step decrease at the 41.5 km position from the start of the span. Thereafter, the optical signal is amplified in the negative dispersion fiber which is connected subsequent to the repeater 107a, but the figure of the gain with reference to the repeater 107a is different for the reverse pumping and the forward pumping, thereby making the increase of the nonlinear distortion more gradual than in the conventional optical communication system. For this reason, the nonlinear distortion in a range between the 41.5 km position and the 50 km position from the start of the span is small compared to the conventional optical communication system. In FIG. 7, R2 denotes this region in which the nonlinear distortion is decreased compared to the conventional optical communication system.

A difference between the areas of the regions R1 and R2 corresponds to the difference between the nonlinear distortion in the present invention and the nonlinear distortion in the conventional optical communication system. Since an optical fiber linear distortion distribution due to Raman amplification by the reverse pumping becomes a function of a higher order than the linear characteristic (first order function), the area of the region R2 becomes larger than the area of the region R1. Therefore, the present invention can suppress the nonlinear distortion in the optical communication system employing Raman amplification to a smaller value compared to the conventional optical communication system.

Next, a description will be given of a structure of the repeater, and a function of communicating information which indicates a disconnection in the optical fiber forming the trunk transmission line regardless of a location of the disconnection.

Figure 8:
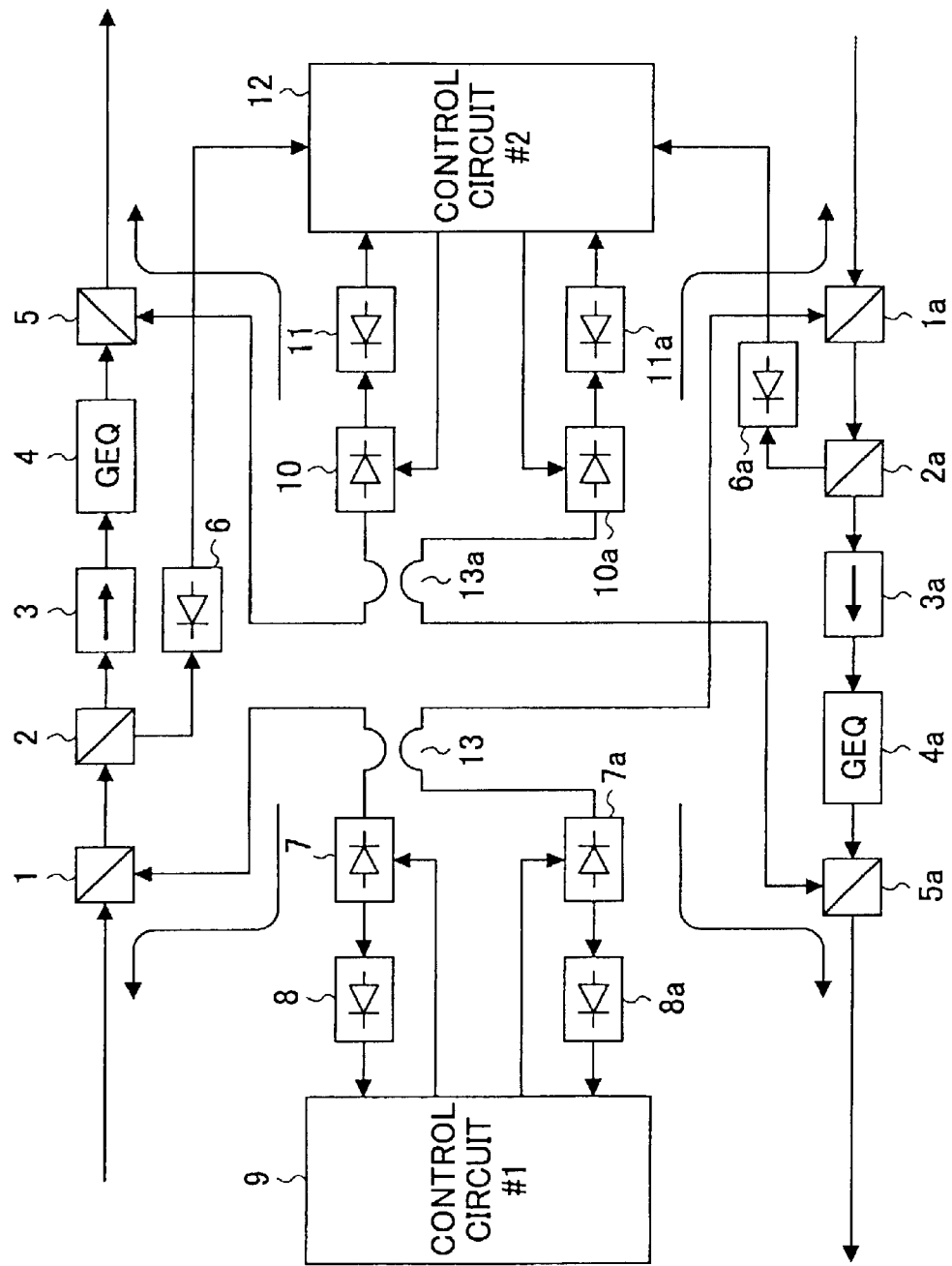
FIG. 8 is a diagram showing a structure of a first embodiment of a repeater.

FIG. 8 is a diagram showing a structure of a first embodiment of the repeater. FIG. 8 shows the structure of the repeater for both the up-line and the down-line.

In FIG. 8, each of couplers 1 and 1a supplies Raman pump light to a negative dispersion fiber in a reverse direction to the optical signal. Each of branching filters 2 and 2a branches a portion of the optical signal. Each of isolators 3 and 3a prevents unwanted light from propagating in a reverse direction. Each of gain equalizers (GEQ) 4 and 4a are provided for gain equalization. Each of couplers 5 and 5a supplies Raman pump light to the negative dispersion fiber in the same direction as the optical signal.

A photoelectric converter (PD) 6 converts the portion of the optical signal branched by the branching filter 2 into an electrical signal, and a photoelectric converter (PD) 6a converts a portion of the optical signal branched by the branching filter 2a into an electrical signal. Although each of the photoelectric converters 6 and 6a is indicated by a photodiode (or diode) symbol in FIG. 8, each of the photoelectric converters 6 and 6a is actually made up of a photodiode which converts the optical signal into a current, and a voltage converter for converting the current into a voltage.

Each of Raman pump light sources (LD) 7 and 7a generates reverse pump light. Although each of the Raman pump light sources 7 and 7a is indicated by a laser diode (or diode) symbol in FIG. 8, each of the Raman pump light sources 7 and 7a is actually made up of a laser diode and a driving current supply unit for supplying a driving current to the laser diode.

A photoelectric converter 8 converts the pump light emitted from the Raman pump light source 7 into an electrical signal, and a photoelectric converter 8a converts the pump light emitted from the Raman pump light source 7a into an electrical signal. It is assumed in FIG. 8 that photodiodes of the photoelectric converters 8 and 8a are formed by photodiodes which receive back lights of the laser diodes forming the Raman pump light sources 7 and 7a, that is, the photodiodes of the photoelectric converters 8 and 8a are respectively mounted within modules of the laser diodes forming the corresponding Raman pump light sources 7 and 7a. However, a portion of the light emitted from the laser diode of each of the Raman pump light sources 7 and 7a may be branched by a branching filter so that each of the photoelectric converters 8 and 8a receives the corresponding branched light portion by a photodiode which is mounted in a module different from that of the laser diode.

A control circuit (#1) 9 receives the electrical signals output from the photoelectric converters 8 and 8a, and controls outputs of the Raman pump light sources 7 and 7a.

A multiplexer 13 multiplexes the lights output from the Raman pump light sources 7 and 7a, and supplies the Raman pump light from one output end to the coupler 1, and supplies the Raman pump light from another end to the coupler 1a.

Each of Raman pump light sources 10 and 10a generates a forward pump light.

A photoelectric converter 11 converts the light emitted from the Raman pump light source 10 into an electrical signal, and a photoelectric converter 11a converts the light emitted from the Raman pump light source 10a into an electrical signal.

A control circuit (#2) 12 receives the electrical signals output from the photoelectric converters 11 and 11a, and controls outputs of the Raman pump light sources 10 and 10a. In addition, the control circuit 12 receives outputs which are obtained by subjecting to a photoelectric conversion portions which are branched from the optical signals input to the photoelectric converters 6 and 6a, and returns a response to the terminal repeating installation (not shown in FIG. 8).

A multiplexer 13a multiplexes the lights output from the Raman pump light sources 10 and 10a, and supplies Raman pump light to the coupler 5 from one output end, and supplies Raman pump light to the coupler 5a from another output end.

In relation to the optical communication system shown in FIG. 6, the negative dispersion fiber is connected to terminals of the couplers 1, 5, 1a and 5a, on opposite ends of terminals which are connected to the constituent elements of the repeater. The optical signal subjected to the Raman amplification is input to the coupler 1, and the optical signal is output from the coupler 5. The optical signal subjected to the Raman amplification is input to the coupler 1a, and the optical signal is output from the coupler 5a. The transmitting direction of the optical signal which is input to the coupler 1 and output from the coupler 5 is defined as an "up" direction, and the transmitting direction of the optical signal which is input to the coupler 1a and output from the coupler 5a is defined as a "down" direction.

Figure 9:
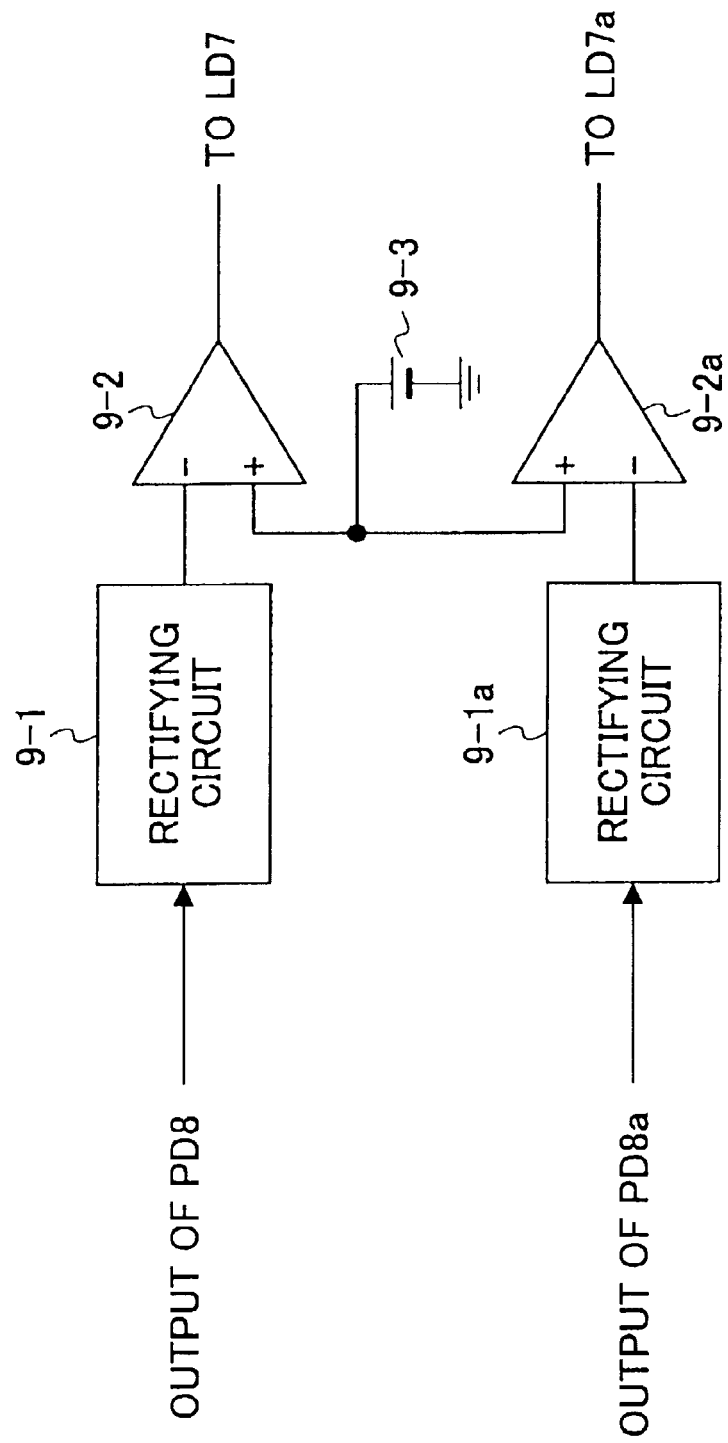
FIG. 9 is a diagram showing a structure of a control circuit shown in FIG. 8.

FIG. 9 is a diagram showing a structure of the control circuit (#1) 9 shown in FIG. 8.

In FIG. 9, a rectifying circuit 9-1 rectifies the output of the photoelectric converter 8 shown in FIG. 8, and a rectifying circuit 9-1a rectifies the output of the photoelectric converter 8a shown in FIG. 8. A differential amplifier 9-2 amplifies a difference between an output of the rectifying circuit 9-1 and an output voltage of a reference voltage source 9-3, and supplies the amplified difference to the Raman pump light source 7 shown in FIG. 8. Similarly, a differential amplifier 9-2a amplifies a difference between an output of the rectifying circuit 9-1a and the output voltage of the reference voltage source 9-3, and supplies the amplified difference to the Raman pump light source 7a shown in FIG. 8.

The voltage obtained by rectifying the output of the photoelectric converter 8 is supplied to an inverting input terminal of the differential amplifier 9-2, and the output voltage of the reference voltage source 9-3 is supplied to a non-inverting input terminal of the differential amplifier 9-2. Hence, if the output light intensity of the Raman pump light source 7 becomes high and the output voltage of the rectifying circuit 9-1 increases, the output voltage of the differential amplifier 9-2 decreases to suppress the output light intensity of the Raman pump light source 7. A similar operation is carried out by the differential amplifier 9-2a with respect to the Raman pump light source 7a.

Accordingly, by using the control circuit 9 having the structure shown in FIG. 9 in the repeater shown in FIG. 8, it is possible to maintain the powers of the Raman pump lights which are supplied in the reverse direction from the couplers 1 and 1a to the corresponding negative dispersion fibers constant.

Figure 10:
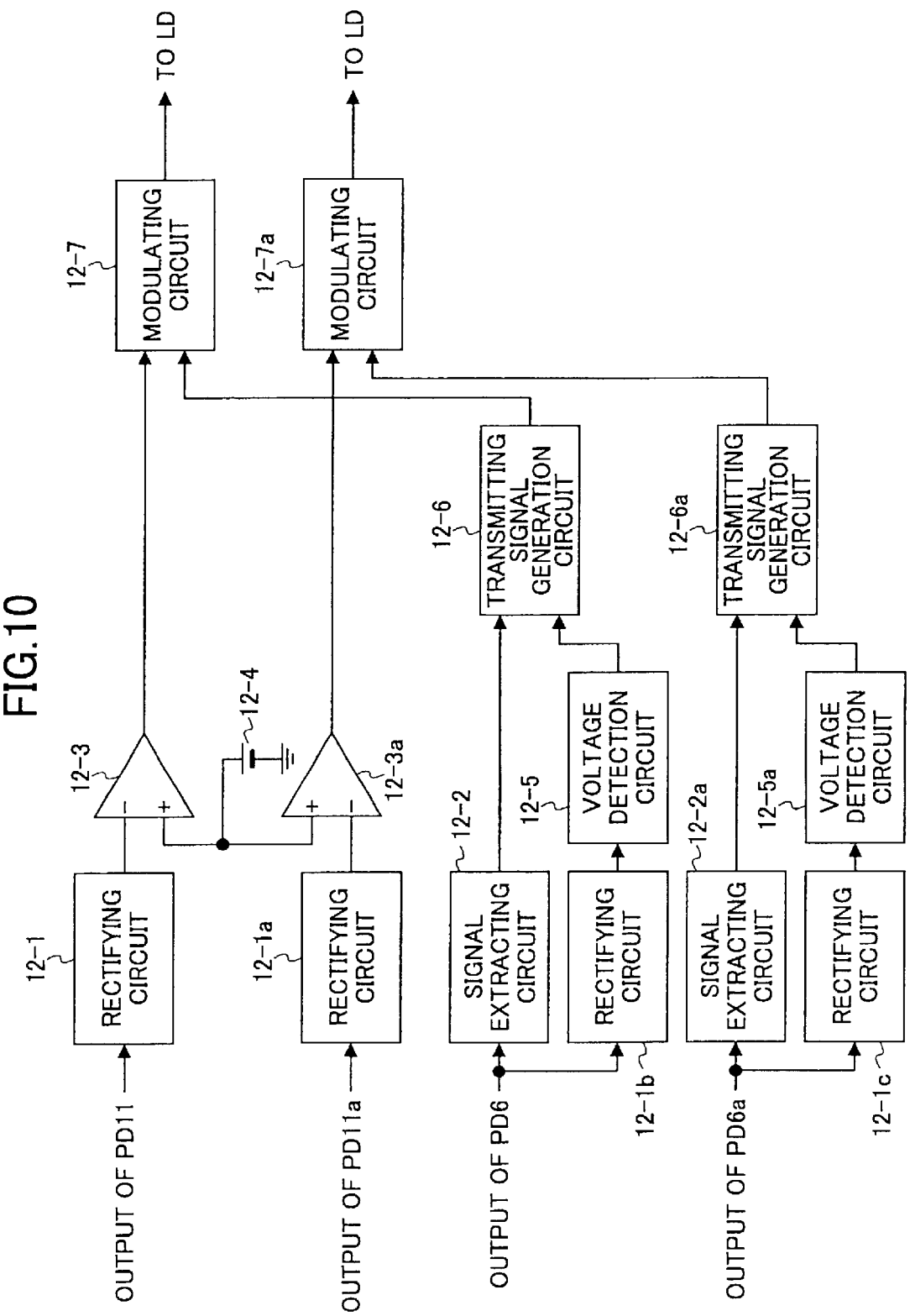
FIG. 10 is a diagram showing a structure of another control circuit shown in FIG. 8.

FIG. 10 is a diagram showing a structure of the control circuit (#2) 12 shown in FIG. 8.

In FIG. 10, a rectifying circuit 12-1 rectifies the output of the photoelectric converter 11 shown in FIG. 8, and a rectifying circuit 12-1a rectifies the output of the photoelectric converter 11a shown in FIG. 8. A differential amplifier 12-3 amplifies a difference between an output of the rectifying circuit 12-1 and an output voltage of a reference voltage source 12-4, and a differential amplifier 12-3a amplifies a difference between an output of the rectifying circuit 12-1a and the output voltage of the reference voltage source 12-4.

A signal extracting circuit 12-2 extracts a signal which is multiplexed to the output of the photoelectric converter 6 shown in FIG. 8. A rectifying circuit 12-1b rectifies the output of the photoelectric converter 6. A voltage detection circuit 12-5 detects an abnormally low output of the rectifying circuit 12-1b. A transmitting signal generation circuit 12-6 generates a signal to be transmitted to the terminal repeating installation, in response to an output of the signal extracting circuit 12-2 and an output of the voltage detection circuit 12-5.

Similarly, a signal extracting circuit 12-2a extracts a signal which is multiplexed to the output of the photoelectric converter 6a shown in FIG. 8. A rectifying circuit 12-1c rectifies the output of the photoelectric converter 6a. A voltage detection circuit 12-5a detects an abnormally low output of the rectifying circuit 12-1c. A transmitting signal generation circuit 12-6a generates a signal to be transmitted to the terminal repeating installation, in response to an output of the signal extracting circuit 12-2a and an output of the voltage detection circuit 12-5a.

A modulating circuit 12-7 modulates the output of the differential amplifier 12-3 by the output of the transmitting signal generation circuit 12-6, and a modulating circuit 12-7a modulates the output of the differential amplifier 12-3a by the output of the transmitting signal generation circuit 12-6a. Each of the modulating circuits 12-7 and 12-7a may be formed by a type of modulating circuit which modulates the output of the differential amplifier by the output of the transmitting signal generation circuit or, by a type of modulating circuit which adds the output of the transmitting signal generation circuit to the output of the differential amplifier. In the latter case, however, it is necessary to match the D.C. levels of the two signals which are added.

If no outputs are obtained from the transmitting signal generation circuits 12-6 and 12-6a, the outputs of the modulating circuits 12-7 and 12-7a respectively become the same as the outputs of the differential amplifiers 12-3 and 12-3a. Hence, by using the control circuit 12 having the structure shown in FIG. 10 in the repeater shown in FIG. 8, it is possible to maintain the powers of the Raman pump lights which are supplied from the couplers 5 and 5a to the corresponding negative dispersion fibers constant.

In the control circuit 12 shown in FIG. 10, a circuit is additionally provided to process the outputs of the photoelectric converters 6 and 6a shown in FIG. 8. This circuit operates in the following manner.

The optical signal is modulated by modulating continuous oscillation light by the signal which is to be transmitted, and is also modulated by a low-frequency monitor signal. The signal which is obtained by converting the optical signal into the electrical signal in each of the photoelectric converters 6 and 6a, corresponds to a signal which is obtained by modulating the signal which is to be transmitted by the monitor signal. Accordingly, by making the signal extracting circuits 12-2 and 12-2a have a structure which cannot respond to the signal which is to be transmitted, and detecting envelopes of the outputs of the photoelectric converters 6 and 6a, it is possible to extract the monitor signal. The monitor signal is a command transmitted from the terminal repeating installation.

On the other hand, after the output of the photoelectric converter 6 is rectified in the rectifying circuit 12-1b, the voltage detection circuit 12-5 can detect an abnormally low rectified voltage. Similarly, the voltage detection circuit 12-5a can detect an abnormally low rectified voltage output from the rectifying circuit 12-1c. Therefore, the transmitting signal generation circuit 12-6 judges an output logic level of the voltage detection circuit 12-5 in response to the command, and selectively outputs a response corresponding to the logic level. For example, responses are stored in an internal memory or an external memory of the transmitting signal generation circuit 12-6, and the response corresponding to the logic level is selected and output from the memory. If the output of the photoelectric converter 6 shown in FIG. 8 is abnormally low, it is regarded that a disconnection has occurred in the trunk transmission up-line, and the response which indicates this disconnection is selectively output.

If the output of the transmitting signal generation circuit 12-6 is supplied to the modulating circuit 12-7 to modulate the output of the differential amplifier 12-3, and the output of the modulating circuit 12-7 is supplied to the Raman pump light source 10 shown in FIG. 8, the driving current supplied to the laser diode of the Raman pump light source 10 varies depending on the response, and it is possible to modulate the Raman pump light output from the Raman pump light source 10.

The Raman pump light output from the Raman pump light source 10 is supplied to the couplers 5 and 5a. Since the case being considered involves the disconnection in the trunk transmission up-line, the Raman pump light supplied to the coupler 5a is most likely of no use. However, when the Raman pump light is supplied from the coupler 5 to the negative dispersion fiber in the down-direction, the Raman pump light causes spontaneous emission light in the negative dispersion fiber. Since the Raman pump light is modulated by the response, the spontaneous emission light is also modulated by the response. Moreover, since the optical signal is not received from the up-line, the spontaneous emission light generated by the Raman pump light has a larger power than when the optical signal is received.

As a result, the spontaneous emission light which is modulated by the response is transmitted while being subjected to Raman amplification in the down-line, and it is possible to transmit information indicating the disconnection of the trunk transmission line to the terminal repeating installation located on the down-end. In addition, if an identification (ID) number of the repeater at the transmitting source is added to the response, it is possible to specify in the terminal repeating installation the location of the span in which the disconnection occurred.

Even if the disconnection occurs in the trunk transmission up-line at a location separated by an arbitrary distance from the repeater, the response indicating the disconnection is always transmitted to the terminal repeating installation because the Raman pump light modulated by the response is supplied to the negative dispersion fiber in the down-direction.

In the description given above, it is assumed that the disconnection occurred in the up-line. However, the operation is basically the same when the disconnection occurs in the down-line. In addition, when no disconnection occurs, the control circuit 12 shown in FIG. 10 selects a corresponding response and modulates the output lights of the Raman pump light sources 10 and 10a. In this case, the modulated lights from the Raman pump light sources 10 and 10a are respectively supplied from the coupler 5 to the negative dispersion fiber in the down-direction and from the coupler 5a to the negative dispersion fiber in the up-direction, thereby transmitting the response to the terminal repeating installations at both ends.

Since the Raman pump light is modulated by the response when transmitting the response, the driving signal supplied to the Raman pump light source is not a D.C. signal. However, the transmitting signal which indicates the response may be generated so that a mark rate of the transmitting signal becomes 50%, and thus, no inconveniences are introduced with respect to the power control of the Raman pump light because an average power of the Raman pump light can be controlled similarly to the case where there is no response.

In the above described embodiment, a wavelength and a polarizing angle of the Raman pump light output from each of the Raman pump light sources are not restricted.

However, by making the wavelength and the polarizing angle of the Raman pump light different for the Raman pump light sources, it is possible to improve the transmission characteristic of the optical communication system employing the Raman amplification.

First, a description will be given of the effects obtained by making the wavelength of the Raman pump light different for the Raman pump light sources.

In this case, the wavelengths of the lights output from the Raman pump light sources 7 and 7a shown in FIG. 8 are set different, and the wavelengths of the lights output from the Raman pump light sources 10 and 10a shown in FIG. 8 are set different. In addition, the wavelength of the light output from one of the Raman pump light sources 7 and 7a is set to match the wavelength of the light output from one of the Raman pump light sources 10 and 10a, and the wavelength of the light output from the other of the Raman pump light sources 7 and 7a is set to match the wavelength of the light output from the other of the Raman pump light sources 10 and 10a.

In this case, each negative dispersion fiber in the up-direction is pumped under the same condition and each negative dispersion fiber in the down-direction is pumped under the same condition, by the corresponding one of the two Raman pump lights having the different wavelengths. In addition, wavelength regions where the Raman amplification takes place by the corresponding Raman pump lights having the different wavelengths mutually differ. As a result, it is possible to broaden the wavelength region in which the optical signal may be relayed in the optical communication system employing the Raman amplification. In other words, it is possible to realize a broadband communication by the optical communication system.

The above described effects are not limited to the case where the Raman pump light sources are provided in two systems as shown in FIG. 8, but also when the Raman pump light sources are provided in three or more systems.

Next, a description will be given of the effects obtained by making the polarizing angle of the Raman pump light different for the Raman pump light sources.

The Raman amplification factor differs between a case where the polarizing angles of the Raman pump light and the optical signal are the same and a case where the polarizing angles of the Raman pump light and the optical signal differ by 90 degrees. The Raman amplification factor is higher for the first case where the polarizing angles of the Raman pump light and the optical signal are the same. Hence, if the polarizing angles of the lights output from the Raman pump light sources 7 and 7a are set to differ by 90 degrees, and for example, and the lights output from the Raman pump light sources 7 and 7a are combined by polarization and supplied to the negative dispersion fiber, relationship of the polarizing angles of the optical signal and the combined polarization Raman pump light can be maintained constant, regardless of the relationship of the polarizing angles of the optical signal and the light output from one of the Raman pump light sources. Actually, both the Raman pump light and the optical signal propagate within the optical fiber while the polarizing angles thereof rotate, but the relationship of the polarizing angles of the optical signal and the combined polarization Raman pump light can be maintained constant. Accordingly, it is possible to stably maintain the Raman amplification factor in the negative dispersion fiber.

The above described effects are not limited to the case where the Raman pump light sources are provided in two systems as shown in FIG. 8, but also when the Raman pump light sources are provided in three or more systems.

Although the Raman pump light sources are provided in two systems in FIG. 8, it is possible to realize the same functions by providing only one system, except for the above described effects of making the wavelength and the polarizing angle of the Raman pump lights different. In other words, the light output from a single Raman pump light source may be branched into two portions by a branching filter, and the two portions may be supplied to corresponding two couplers.

In the optical submarine communication system which requires an extremely high reliability, it is desirable to provide the Raman pump light sources in two or more systems. However, in the case of an optical land communication system which uses land transmission lines and repeaters provided within stations, it is possible to reduce the cost by providing only one system of Raman pump light source.

Figure 11:
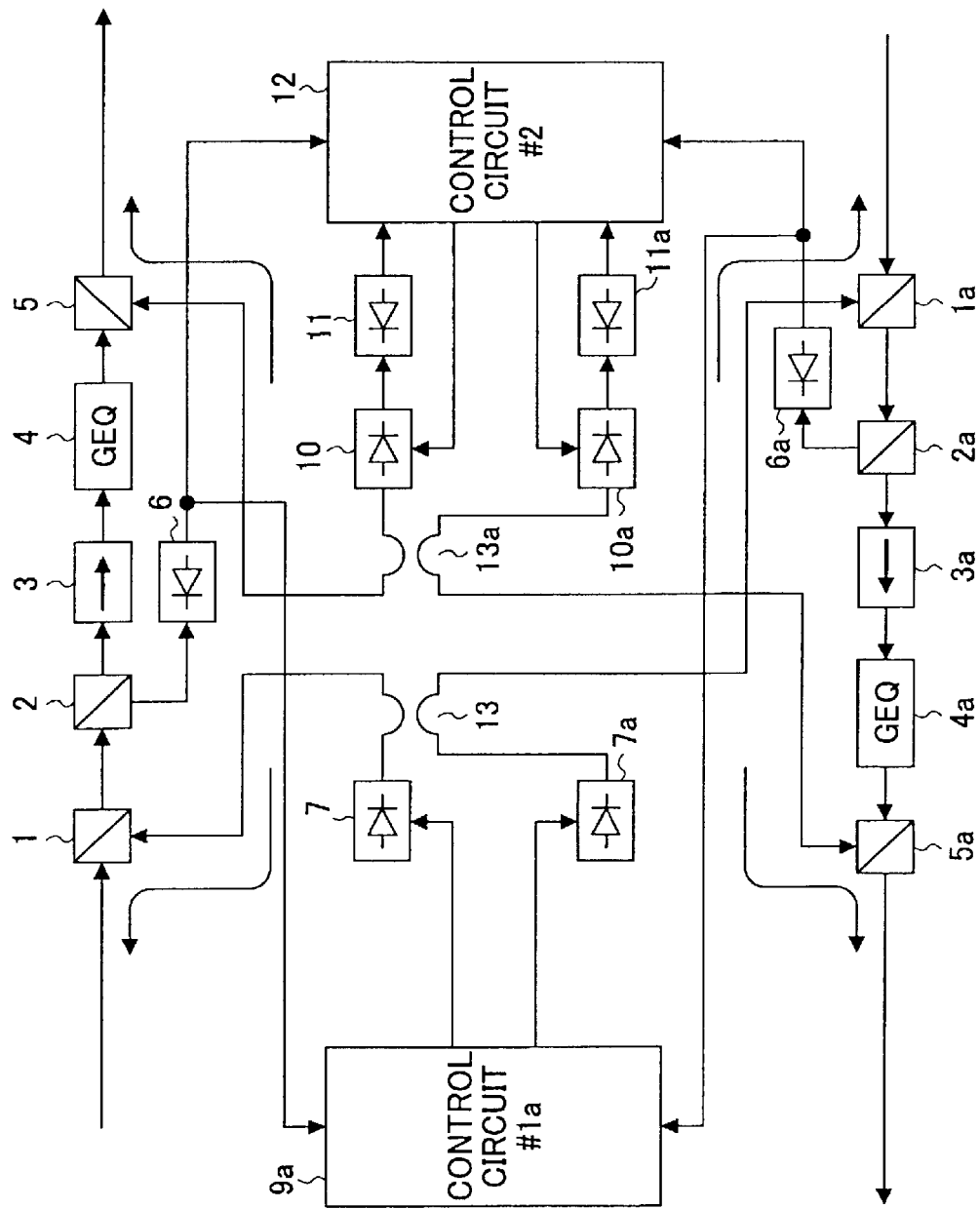
FIG. 11 is a diagram showing a structure of a second embodiment of the repeater.

FIG. 11 is a diagram showing a structure of a second embodiment of the repeater. FIG. 11 shows the structure of the repeater for both the up-line and the down-line. In FIG. 11, those parts which are the same as those corresponding parts in FIG. 8 are designated by the same reference numerals.

In FIG. 11, each of couplers 1 and 1a supplies Raman pump light to a negative dispersion fiber in a reverse direction to the optical signal. Each of branching filters 2 and 2a branches a portion of the optical signal. Each of isolators 3 and 3a prevents unwanted light from propagating in a reverse direction. Each of gain equalizers (GEQ) 4 and 4a are provided for gain equalization. Each of couplers 5 and 5a supplies Raman pump light to the negative dispersion fiber in the same direction as the optical signal.

A photoelectric converter (PD) 6 converts the portion,of the optical signal branched by the branching filter 2 into an electrical signal, and a photoelectric converter (PD) 6a converts a portion of the optical signal branched by the branching filter 2a into an electrical signal. Although each of the photoelectric converters 6 and 6a is indicated by a photodiode (or diode) symbol in FIG. 11, each of the photoelectric converters 6 and 6a is actually made up of a photodiode which converts the optical signal into a current, and a voltage converter for converting the current into a voltage.

Each of Raman pump light sources (LD) 7 and 7a generates reverse pump light. Although each of the Raman pump light sources 7 and 7a is indicated by a laser diode (or diode) symbol in FIG. 8, each of the Raman pump light sources 7 and 7a is actually made up of a laser diode and a driving current supply unit for supplying a driving current to the laser diode.

A control circuit (#1a) 9a receives the electrical signals output from the photoelectric converters 6 and 6a, and controls outputs of the Raman pump light sources 7 and 7a.

A multiplexer 13 multiplexes the lights output from the Raman pump light sources 7 and 7a, and supplies the Raman pump light from one output end to the coupler 1, and supplies the Raman pump light from another end to the coupler 1a.

Each of Raman pump light sources 10 and 10a generates a forward pump light.

A photoelectric converter 11 converts the light emitted from the Raman pump light source 10 into an electrical signal, and a photoelectric converter 11a converts the light emitted from the Raman pump light source 10a into an electrical signal.

A control circuit (#2) 12 receives the electrical signals output from the photoelectric converters 11 and 11a, and controls outputs of the Raman pump light sources 10 and 10a. In addition, the control circuit 12 receives outputs which are obtained by subjecting to a photoelectric conversion portions which are branched from the optical signals input to the photoelectric converters 6 and 6a, and returns a response to the terminal repeating installation (not shown in FIG. 8). The control circuit 12 is the same as the control circuit 12 shown in FIG. 8.

A multiplexer 13a multiplexes the lights output from the Raman pump light sources 10 and 10a, and supplies Raman pump light to the coupler 5 from one output end, and supplies Raman pump light to the coupler 5a from another output end.

In relation to the optical communication system shown in FIG. 6, the negative dispersion fiber is connected to terminals of the couplers 1, 5, 1a and 5a, on opposite ends of terminals which are connected to the constituent elements of the repeater. The optical signal subjected to the Raman amplification is input to the coupler 1, and the optical signal is output from the coupler 5. The optical signal subjected to the Raman amplification is input to the coupler 1a, and the optical signal is output from the coupler 5a.

Accordingly, the second embodiment of the repeater shown in FIG. 11 is characterized by the control circuit 9a which receives the electrical signals output from the photoelectric converters 6 and 6a and controls the outputs of the Raman pump light sources 7 and 7a.

Figure 12:
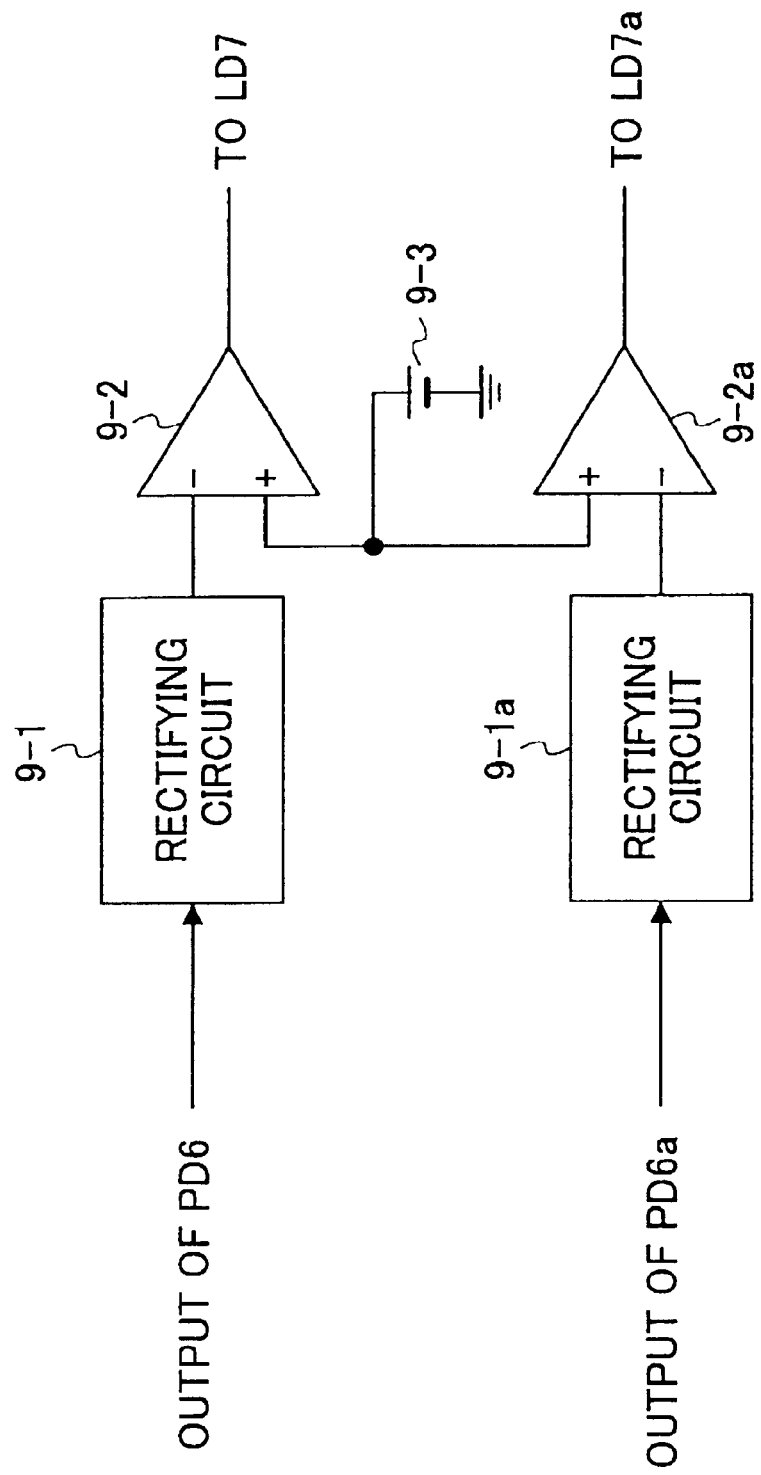
FIG. 12 is a diagram showing a structure of a control circuit shown in FIG. 11.

FIG. 12 is a diagram showing a structure of the control circuit (#1a) 9a shown in FIG. 11. The basic structure of the control circuit 9a is the same as that of the control circuit 9 shown in FIG. 9, but the outputs of the photoelectric converters used are different, as will be described hereunder.

In FIG. 12, a rectifying circuit 9-1 rectifies the output of the photoelectric converter 6 shown in FIG. 11, and a rectifying circuit 9-1a rectifies the output of the photoelectric converter 6a shown in FIG. 11. A differential amplifier 9-2 amplifies a difference between an output of the rectifying circuit 9-1 and an output voltage of a reference voltage source 9-3, and supplies the amplified difference to the Raman pump light source 7 shown in FIG. 11. Similarly, a differential amplifier 9-2a amplifies a difference between an output of the rectifying circuit 9-1a and the output voltage of the reference voltage source 9-3, and supplies the amplified difference to the Raman pump light source 7a shown in FIG. 11.

The voltage obtained by rectifying the output of the photoelectric converter 6 is supplied to an inverting input terminal of the differential amplifier 9-2, and the output voltage of the reference voltage source 9-3 is supplied to a non-inverting input terminal of the differential amplifier 9-2. Hence, if the level of the input optical signal becomes high and the output voltage of the rectifying circuit 9-1 increases, the output voltage of the differential amplifier 9-2 decreases to suppress the output light intensity of the Raman pump light source 7. A similar operation is carried out by the differential amplifier 9-2a with respect to the Raman pump light source 7a.

Accordingly, by using the control circuit 9a having the structure shown in FIG. 12 in the repeater shown in FIG. 11, it is possible to control the Raman pump light sources 7 and 7a so that the levels of the optical signals received by the couplers 1 and 1a become constant.

The control circuit 12 shown in FIG. 11 has the same structure as the control circuit 12 shown in FIG. 8, and the functions of the two control circuits 12 are the same. Accordingly, a description on the structure and functions of the control circuit 12 shown in FIG. 11 will be omitted.

In a case where the Raman pump light sources are provided in two or more systems, the effects of making the wavelengths of the lights output from the Raman pump light sources forming a pair different, and the effects of making the polarizing angles of the lights output from the Raman pump light sources forming the pair different, are the same as the effects described above in conjunction with FIG. 8.

Furthermore, as in the case of FIG. 8, although the Raman pump light sources are provided in two systems in FIG. 11, it is possible to realize the same functions by providing only one system, except for the above described effects of making the wavelength and the polarizing angle of the Raman pump lights different.

Figure 13:
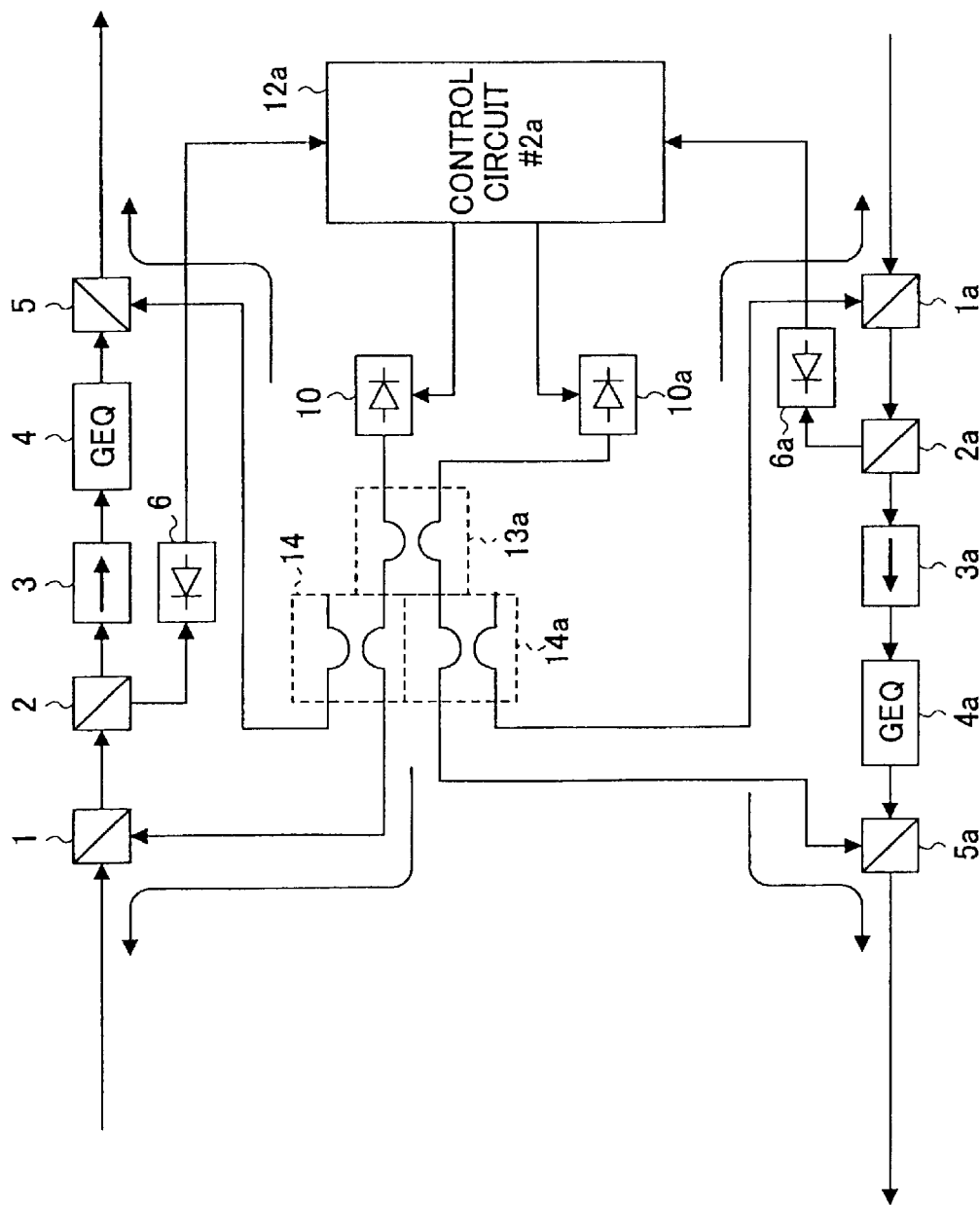
FIG. 13 is a diagram showing a structure of a third embodiment of the repeater.

FIG. 13 is a diagram showing a structure of a third embodiment of the repeater. FIG. 13 shows the structure of the repeater for both the up-line and the down-line. In FIG. 13, those parts which are the same as those corresponding parts in FIGS. 8 or 11 are designated by the same reference numerals.

In FIG. 13, each of couplers 1 and 1a supplies Raman pump light to a negative dispersion fiber in a reverse direction to the optical signal. Each of branching filters 2 and 2a branches a portion of the optical signal. Each of isolators 3 and 3a prevents unwanted light from propagating in a reverse direction. Each of gain equalizers (GEQ) 4 and 4a are provided for gain equalization. Each of couplers 5 and 5a supplies Raman pump light to the negative dispersion fiber in the same direction as the optical signal.

A photoelectric converter (PD) 6 converts the portion of the optical signal branched by the branching filter 2 into an electrical signal, and a photoelectric converter (PD) 6a converts a portion of the optical signal branched by the branching filter 2a into an electrical signal. Although each of the photoelectric converters 6 and 6a is indicated by a photodiode (or diode) symbol in FIG. 11, each of the photoelectric converters 6 and 6a is actually made up of a photodiode which converts the optical signal into a current, and a voltage converter for converting the current into a voltage.

A Raman pump light source 10 generates a forward direction pump light, and a Raman pump light source 10a generates a reverse direction pump light.

A control circuit (#2a) 12a receives the electrical signals output from the photoelectric converters 6 and 6a, and controls outputs of the Raman pump light sources 10 and 10a. In addition, the control circuit 12a receives outputs which are obtained by subjecting to a photoelectric conversion portions which are branched from the optical signals input to the photoelectric converters 6 and 6a, and returns a response to the terminal repeating installation (not shown in FIG. 13).

A multiplexer 13a multiplexes the lights output from the Raman pump light sources 10 and 10a, and supplies Raman pump lights to the couplers 5 and 5a from two output ends.

In relation to the optical communication system shown in FIG. 6, the negative dispersion fiber is connected to terminals of the couplers 1, 5, 1a and 5a, on opposite ends of terminals which are connected to the constituent elements of the repeater. The optical signal subjected to the Raman amplification is input to the coupler 1, and the optical signal is output from the coupler 5. The optical signal subjected to the Raman amplification is input to the coupler 2a, and the optical signal is output from the coupler 5a.

Accordingly, the third embodiment of the repeater shown in FIG. 13 is characterized in that the control circuit 9 shown in FIG. 8 or FIG. 11 is omitted. In addition, the third embodiment of the repeater is characterized by the control circuit 12a which receives the electrical signals output from the photoelectric converters 6 and 6a and controls the outputs of the Raman pump light sources 10 and 10a. Furthermore, the third embodiment of the repeater is also characterized in that the control circuit 12a receives the outputs which are obtained by subjecting to the photoelectric conversion portions which are branched from the optical signals input to the photoelectric converters 6 and 6a, and returns a response to the terminal repeating installation.

Figure 14:
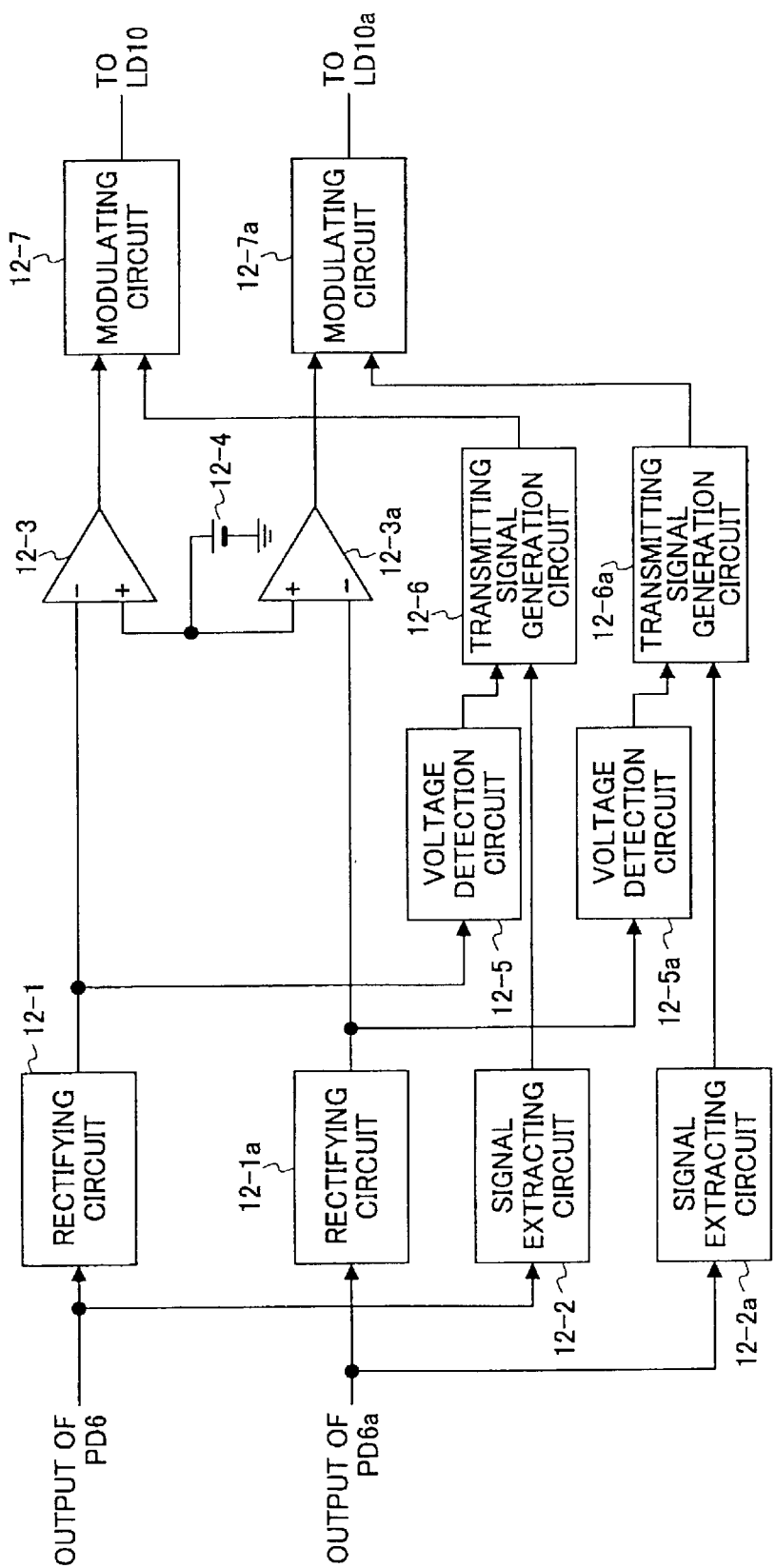
FIG. 14 is a diagram showing a structure of a control circuit shown in FIG. 13.

FIG. 14 is a diagram showing a structure of the control circuit (#2a) 12a shown in FIG. 13. In FIG. 14, those parts which are the same as those corresponding parts in FIG. 10 are designated by the same reference numerals.

In FIG. 14, a rectifying circuit 12-1 rectifies the output of the photoelectric converter 6 shown in FIG. 13, and a rectifying circuit 12-1a rectifies the output of the photoelectric converter 6a shown in FIG. 13. A differential amplifier 12-3 amplifies a difference between an output of the rectifying circuit 12-1 and an output voltage of a reference voltage source 12-4, and a differential amplifier 12-3a amplifies a difference between an output of the rectifying circuit 12-1a and the output voltage of the reference voltage source 12-4.

A signal extracting circuit 12-2 extracts a signal which is multiplexed to the output of the photoelectric converter 6 shown in FIG. 13. A voltage detection circuit 12-5 detects an abnormally low output of the rectifying circuit 12-1. A transmitting signal generation circuit 12-6 generates a signal to be transmitted to the terminal repeating installation, in response to an output of the signal extracting circuit 12-2 and an output of the voltage detection circuit 12-5.

Similarly, a signal extracting circuit 12-2a extracts a signal which is multiplexed to the output of the photoelectric converter 6a shown in FIG. 13. A voltage detection circuit 12-5a detects an abnormally low output of the rectifying circuit 12-1a. A transmitting signal generation circuit 12-6a generates a signal to be transmitted to the terminal repeating installation, in response to an output of the signal extracting circuit 12-2a and an output of the voltage detection circuit 12-5a.

A modulating circuit 12-7 modulates the output of the differential amplifier 12-3 by the output of the transmitting signal generation circuit 12-6, and a modulating circuit 12-7a modulates the output of the differential amplifier 12-3a by the output of the transmitting signal generation circuit 12-6a. Each of the modulating circuits 12-7 and 12-7a may be formed by a type of modulating circuit which modulates the output of the differential amplifier by the output of the transmitting signal generation circuit or, by a type of modulating circuit which adds the output of the transmitting signal generation circuit to the output of the differential amplifier. In the latter case, however, it is necessary to match the D.C. levels of the two signals which are added.

If no outputs are obtained from the transmitting signal generation circuits 12-6 and 12-6a, the outputs of the modulating circuits 12-7 and 12-7a respectively become the same as the outputs of the differential amplifiers 12-3 and 12-3a. Hence, by using the control circuit 12a having the structure shown in FIG. 14 in the repeater shown in FIG. 13, it is possible to maintain the levels of the input optical signals constant, similarly to the control circuit 9a shown in FIG. 11.

The optical signal is modulated by modulating continuous oscillation light by the signal which is to be transmitted, and is also modulated by a low-frequency monitor signal. The signal which is obtained by converting the optical signal into the electrical signal in each of the photoelectric converters 6 and 6a, corresponds to a signal which is obtained by modulating the signal which is to be transmitted by the low-frequency monitor signal. Accordingly, by making the signal extracting circuits 12-2 and 12-2a have a structure which cannot respond to the signal which is to be transmitted, and detecting envelopes of the outputs of the photoelectric converters 6 and 6a, it is possible to extract the monitor signal. The monitor signal is a command transmitted from the terminal repeating installation.

On the other hand, after the output of the photoelectric converter 6 is rectified in the rectifying circuit 12-1, the voltage detection circuit 12-5 can detect an abnormally low rectified voltage. Similarly, the voltage detection circuit 12-5a can detect an abnormally low rectified voltage output from the rectifying circuit 12-1a.

Therefore, the transmitting signal generation circuit 12-6 judges an output logic level of the voltage detection circuit 12-5 in response to the command, and selectively outputs a response corresponding to the logic level. For example, responses are stored in an internal memory or an external memory of the transmitting signal generation circuit 12-6, and the response corresponding to the logic level is selected and output from the memory. If the output of the photoelectric converter 6 shown in FIG. 13 is abnormally low, it is regarded that a disconnection has occurred in the trunk transmission up-line, and the response which indicates this disconnection is selectively output.

If the output of the transmitting signal generation circuit 12-6 is supplied to the modulating circuit 12-7 to modulate the output of the differential amplifier 12-3, and the output of the modulating circuit 12-7 is supplied to the Raman pump light source 10 shown in FIG. 13, the driving current supplied to the laser diode of the Raman pump light source 10 varies depending on the response, and it is possible to modulate the Raman pump light output from the Raman pump light source 10.

The Raman pump light output from the Raman pump light source 10 is supplied to all of the couplers 1, 1a, 5 and 5a. Since the case being considered involves the disconnection in the trunk transmission up-line, the Raman pump light supplied to the coupler 5a is most likely of no use. However, when the Raman pump light is supplied to the negative dispersion fiber via the couplers 1 and 5, the Raman pump light causes spontaneous emission light in the negative dispersion fiber. Since the Raman pump light is modulated by the response, the spontaneous emission light is also modulated by the response. Moreover, since the optical signal is not received from the up-line, the spontaneous emission light generated by the Raman pump light has a larger power than when the optical signal is received.

As a result, the spontaneous emission light which is modulated by the response is transmitted while being subjected to Raman amplification in the down-line, and it is possible to transmit information indicating the disconnection of the trunk transmission line to the terminal repeating installation located on the down-end. In addition, if an identification (ID) number of the repeater at the transmitting source is added to the response, it is possible to specify in the terminal repeating installation the location of the span in which the disconnection occurred.

Even if the disconnection occurs in the trunk transmission up-line at a location separated by an arbitrary distance from the repeater, the response indicating the disconnection is always transmitted to the terminal repeating installation because the Raman pump light modulated by the response is supplied to the negative dispersion fiber in the down-direction.

In the description given above, it is assumed that the disconnection occurred in the up-line. However, the operation is basically the same when the disconnection occurs in the down-line.

In addition, when no disconnection occurs, the control circuit 12a shown in FIG. 14 selects a corresponding response and modulates the output lights of the Raman pump light sources 10 and 10a. In this case, the modulated lights from the Raman pump light sources 10 and 10a are respectively supplied from the coupler 1 to the negative dispersion fiber in the up-direction and from the coupler 5 to the negative dispersion fiber in the down-direction, and from the coupler 1a to the negative dispersion fiber in the down-direction and from the coupler 5a to the negative dispersion fiber in the up-direction, thereby transmitting the response to the terminal repeating installations at both ends.

Since the Raman pump light is modulated by the response when transmitting the response, the driving signal supplied to the Raman pump light source is not a D.C. signal. However, the transmitting signal which indicates the response may be generated so that a mark rate of the transmitting signal becomes 50%, and thus, no inconveniences are introduced with respect to the power control of the Raman pump light because an average power of the Raman pump light can be controlled similarly to the case where there is no response.

In a case where the Raman pump light sources are provided in two or more systems, the effects of making the wavelengths of the lights output from the Raman pump light sources forming a pair different, and the effects of making the polarizing angles of the lights output from the Raman pump light sources forming the pair different, are the same as the effects described above in conjunction with FIG. 8 or FIG. 11.

Furthermore, as in the case of FIG. 8 or FIG. 11, although the Raman pump light sources are provided in two systems in FIG. 13, it is possible to realize the same functions by providing only one system, except for the above described effects of making the wavelength and the polarizing angle of the Raman pump lights different.

Therefore, according to the present invention, it is possible to obtain a good nonlinear characteristic related to Raman amplification in the optical communication system employing the Raman amplification, and a broadband communication can be made. In addition, it is possible to communicate information indicating a disconnection in the optical fiber forming the trunk transmission line, regardless of the location of the disconnection in the optical fiber.

Further, the present invention is not limited to these embodiments, but various variations and modifications may be made without departing from the scope of the present invention.

What is claimed is:

1. An optical communication system employing Raman amplification, comprising:
   a plurality of first optical fibers, each having a first nonlinear effective cross sectional area, and each coupled to a terminal station or a repeater in a transmission line between the terminal station and the repeater or between two repeaters;
   a second optical fiber, having a second nonlinear effective cross sectional area larger than the first nonlinear effective cross sectional area, and coupled between two first optical fibers,
   the Raman amplification being made in the transmission line by pumping in two directions from the two repeaters coupled to both ends of the transmission line or from the terminal station and the repeater.

2. The optical communication system as claimed in claim 1, wherein each repeater comprises:
   a first Raman pump light source emitting a pump light in a reverse direction;
   a second Raman pump light source emitting a pump light in a forward direction;
   a first control circuit controlling an output power of the first Raman pump light source constant; and
   a second control circuit controlling an output power of the second Raman pump light source constant, and modulating the second Raman pump light source by a response signal with respect to a host unit depending on an analysis result of a monitor signal transferred from the host unit and a state of an input optical signal which is input to the repeater.

3. The optical communication system as claimed in claim 2, wherein each of the first and second Raman pump light sources are formed by a combination of a plurality of pump light sources which emit pump lights having mutually different wavelengths.

4. The optical communication system as claimed in claim 2, wherein each of the first and second Raman pump light sources are formed by a combination of a plurality of pump light sources which emit pump lights having mutually different polarizing angles, and combines the pump lights by polarization to generate a Raman pump light.

5. The optical communication system as claimed in claim 1, wherein each repeater comprises:
   a first Raman pump light source emitting a pump light in a reverse direction;
   a second Raman pump light source emitting a pump light in a forward direction;
   a first control circuit controlling a power of an optical signal input to the repeater constant; and
   a second control circuit controlling an output power of the second Raman pump light source constant, and modulating the second Raman pump light source by a response signal with respect to a host unit depending on an analysis result of a monitor signal transferred from the host unit and a state of an input optical signal which is input to the repeater.

6. The optical communication system as claimed in claim 5, wherein each of the first and second Raman pump light sources are formed by a combination of a plurality of pump light sources which emit pump lights having mutually different wavelengths.

7. The optical communication system as claimed in claim 5, wherein each of the first and second Raman pump light sources are formed by a combination of a plurality of pump light sources which emit pump lights having mutually different polarizing angles, and combines the pump lights by polarization to generate a Raman pump light.

8. The optical communication system as claimed in claim 1, wherein each repeater comprises:
   a Raman pump light source used in common for forward and reverse Raman pumping; and
   a control circuit maintaining a power of an input optical signal which is input to the repeater constant, and modulating the Raman pump light source by a response signal with respect to a host unit depending on an analysis result of a monitor signal transferred from the host unit and a state of the input optical signal.

9. The optical communication system as claimed in claim 8, wherein the Raman pump light source is formed by a combination of a plurality of pump light sources which emit pump lights having mutually different wavelengths.

10. The optical communication system as claimed in claim 8, wherein the Raman pump light source is formed by a combination of a plurality of pump light sources which emit pump lights having mutually different polarizing angles, and combines the pump lights by polarization to generate a Raman pump light.

11. An optical communication system employing Raman amplification, comprising:
- a plurality of first optical fibers, each having a first nonlinear effective cross sectional area, and each coupled to a repeater in a transmission line between two repeaters;
- a second optical fiber, having a second nonlinear effective cross sectional area larger than the first nonlinear effective cross sectional area, and coupled between two first optical fibers;
- a plurality of third optical fibers, each having the first nonlinear effective cross sectional area, and each coupled to a repeater in a transmission line between a terminal station and the repeater; and
- a fourth optical fiber, having the second nonlinear effective cross sectional area, and coupled between two third optical fibers,
- the Raman amplification being made in the transmission line between the two repeaters by pumping in two directions from the two repeaters coupled to both ends of the transmission line.

12. The optical communication system as claimed in claim 11, wherein each repeater comprises:
- a first Raman pump light source emitting a pump light in a reverse direction;
- a second Raman pump light source emitting a pump light in a forward direction;
- a first control circuit controlling an output power of the first Raman pump light source constant; and
- a second control circuit controlling an output power of the second Raman pump light source constant, and modulating the second Raman pump light source by a response signal with respect to a host unit depending on an analysis result of a monitor signal transferred from the host unit and a state of an input optical signal.

13. The optical communication system as claimed in claim 12, wherein each of the first and second Raman pump light sources are formed by a combination of a plurality of pump light sources which emit pump lights having mutually different wavelengths.

14. The optical communication system as claimed in claim 12, wherein each of the first and second Raman pump light sources are formed by a combination of a plurality of pump light sources which emit pump lights having mutually different polarizing angles, and combines the pump lights by polarization to generate a Raman pump light.

15. The optical communication system as claimed in claim 11, wherein each repeater comprises:
- a first Raman pump light source emitting a pump light in a reverse direction;
- a second Raman pump light source emitting a pump light in a forward direction;
- a first control circuit controlling a power of an optical signal input to the repeater constant; and
- a second control circuit controlling an output power of the second Raman pump light source constant, and modulating the second Raman pump light source by a response signal with respect to a host unit depending on an analysis result of a monitor signal transferred from the host unit and a state of an input optical signal.

16. The optical communication system as claimed in claim 15, wherein each of the first and second Raman pump light sources are formed by a combination of a plurality of pump light sources which emit pump lights having mutually different wavelengths.

17. The optical communication system as claimed in claim 15, wherein each of the first and second Raman pump light sources are formed by a combination of a plurality of pump light sources which emit pump lights having mutually different polarizing angles, and combines the pump lights by polarization to generate a Raman pump light.

18. The optical communication system as claimed in claim 11, wherein each repeater comprises:
- a Raman pump light source used in common for forward and reverse Raman pumping; and
- a control circuit maintaining a power of an input optical signal which is input to the repeater constant, and modulating the Raman pump light source by a response signal with respect to a host unit depending on an analysis result of a monitor signal transferred from the host unit and a state of the input optical signal.

19. The optical communication system as claimed in claim 18, wherein the Raman pump light source is formed by a combination of a plurality of pump light sources which emit pump lights having mutually different wavelengths.

20. The optical communication system as claimed in claim 18, wherein the Raman pump light source is formed by a combination of a plurality of pump light sources which emit pump lights having mutually different polarizing angles, and combines the pump lights by polarization to generate a Raman pump light.

* * * * *

UNITED STATES PATENT AND TRADEMARK OFFICE
CERTIFICATE OF CORRECTION

PATENT NO. : 6,909,535 B2
DATED : June 21, 2005
INVENTOR(S) : Toshikazu Ueki

It is certified that error appears in the above-identified patent and that said Letters Patent is hereby corrected as shown below:

<u>Title page,</u>
Item [56], References Cited, OTHER PUBLICATIONS,
"Okuno et al.," reference, change "Amlification" to -- Amplification --.

Signed and Sealed this

Twenty-first Day of March, 2006

JON W. DUDAS
*Director of the United States Patent and Trademark Office*